United States Patent
Park et al.

(10) Patent No.: US 11,100,900 B2
(45) Date of Patent: Aug. 24, 2021

(54) FOLDABLE DISPLAY AND DRIVING METHOD THEREOF

(71) Applicant: LG Display Co., Ltd., Seoul (KR)

(72) Inventors: Myung Jong Park, Paju-si (KR); Dae Seok Oh, Paju-si (KR); Jin Woo Jung, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/886,554

(22) Filed: May 28, 2020

(65) Prior Publication Data
US 2020/0394984 A1 Dec. 17, 2020

(30) Foreign Application Priority Data
Jun. 12, 2019 (KR) .................. 10-2019-0069623

(51) Int. Cl.
*G09G 3/3258* (2016.01)
*G09G 5/373* (2006.01)
*G09G 3/3266* (2016.01)
*G09G 3/3291* (2016.01)

(52) U.S. Cl.
CPC .......... *G09G 5/373* (2013.01); *G09G 3/3258* (2013.01); *G09G 3/3266* (2013.01); *G09G 3/3291* (2013.01); *G09G 2380/02* (2013.01)

(58) Field of Classification Search
CPC .. G09G 3/3233; G09G 3/3258; G09G 3/3266; G09G 3/3291; G09G 5/373; G09G 2300/0861; G09G 2310/04; G09G 2310/0251; G09G 2310/0262; G09G 2340/0407; G09G 2340/0435; G09G 2380/02; G09G 2320/0261; G09G 2354/00; G09G 3/035; G09G 3/3208; G06F 1/1652; G06F 1/1641; G06F 3/038; G06F 3/1446; G06F 3/14; G06F 2200/1637; G06F 3/0483; G09F 9/301; G01B 7/30
See application file for complete search history.

(56) References Cited

U.S. PATENT DOCUMENTS 9,489,080 B2 * 11/2016 Seo .................. G06F 3/1438
9,684,342 B2 * 6/2017 Kim .................. G06F 3/04883
(Continued)

FOREIGN PATENT DOCUMENTS

EP         2 333 761 A1    6/2011
KR   10-2012-0065683 A    6/2012
(Continued)

OTHER PUBLICATIONS

Partial European Search Report dated Oct. 19, 2020 issued in corresponding Patent Application No. EP 20178325.5 (16 pages).
(Continued)

*Primary Examiner* — Vijay Shankar
(74) *Attorney, Agent, or Firm* — Polsinelli PC

(57) ABSTRACT

A foldable display comprises a flexible display panel including a screen which displays an image; a measuring part configured to measure a folding angle of the flexible display panel; and an image processor configured to vary a size of the image displayed on the screen and a size of a black pattern displayed on the screen of the flexible display panel while the folding angle of the flexible display panel is varied.

20 Claims, 36 Drawing Sheets

(56) References Cited

U.S. PATENT DOCUMENTS

| | | | |
|---|---|---|---|
| 2010/0182265 A1* | 7/2010 | Kim | G06F 1/1641 |
| | | | 345/173 |
| 2012/0001893 A1 | 1/2012 | Jeong et al. | |
| 2015/0009128 A1* | 1/2015 | Matsumoto | G06F 1/1643 |
| | | | 345/156 |
| 2015/0309691 A1* | 10/2015 | Seo | G06F 1/1652 |
| | | | 345/173 |
| 2016/0034047 A1 | 2/2016 | Lee et al. | |
| 2016/0147362 A1* | 5/2016 | Eim | G06F 3/0416 |
| | | | 345/173 |
| 2016/0187994 A1 | 6/2016 | La et al. | |
| 2016/0372083 A1* | 12/2016 | Taite | G06F 1/1652 |
| 2020/0192432 A1* | 6/2020 | Yee | G06F 3/041 |
| 2021/0034107 A1* | 2/2021 | Therien | G06F 3/0483 |

FOREIGN PATENT DOCUMENTS

| | | |
|---|---|---|
| KR | 10-2016-0057225 A | 5/2016 |
| TW | 201706977 A | 2/2017 |

OTHER PUBLICATIONS

Extended European Search Report dated Feb. 24, 2021 issued in European Patent Application EP 20178325.5. (25 pages).
Taiwanese Office Action dated May 6, 2021 issued in corresponding Patent Application No. 109119529 w/English Translation (9 pages).

\* cited by examiner

FIG. 11
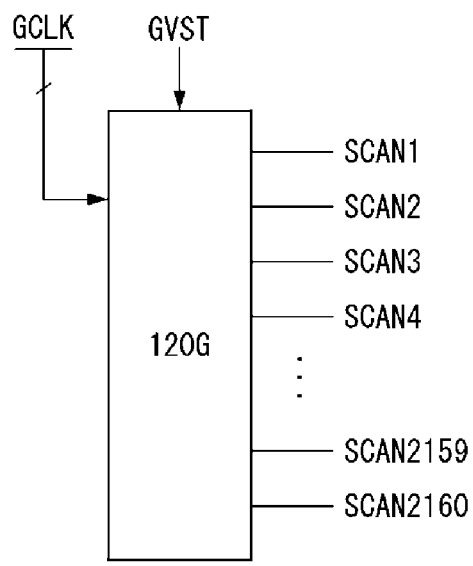
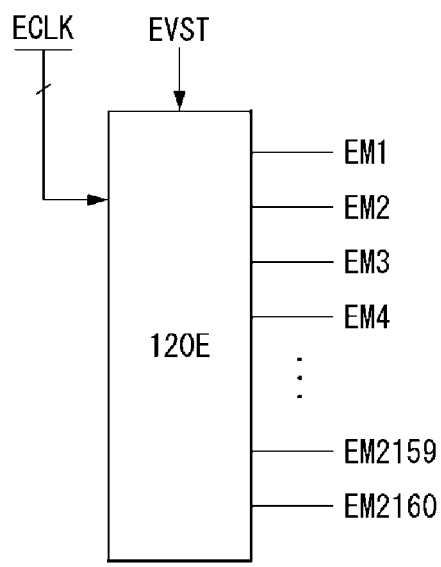

FIG. 16A
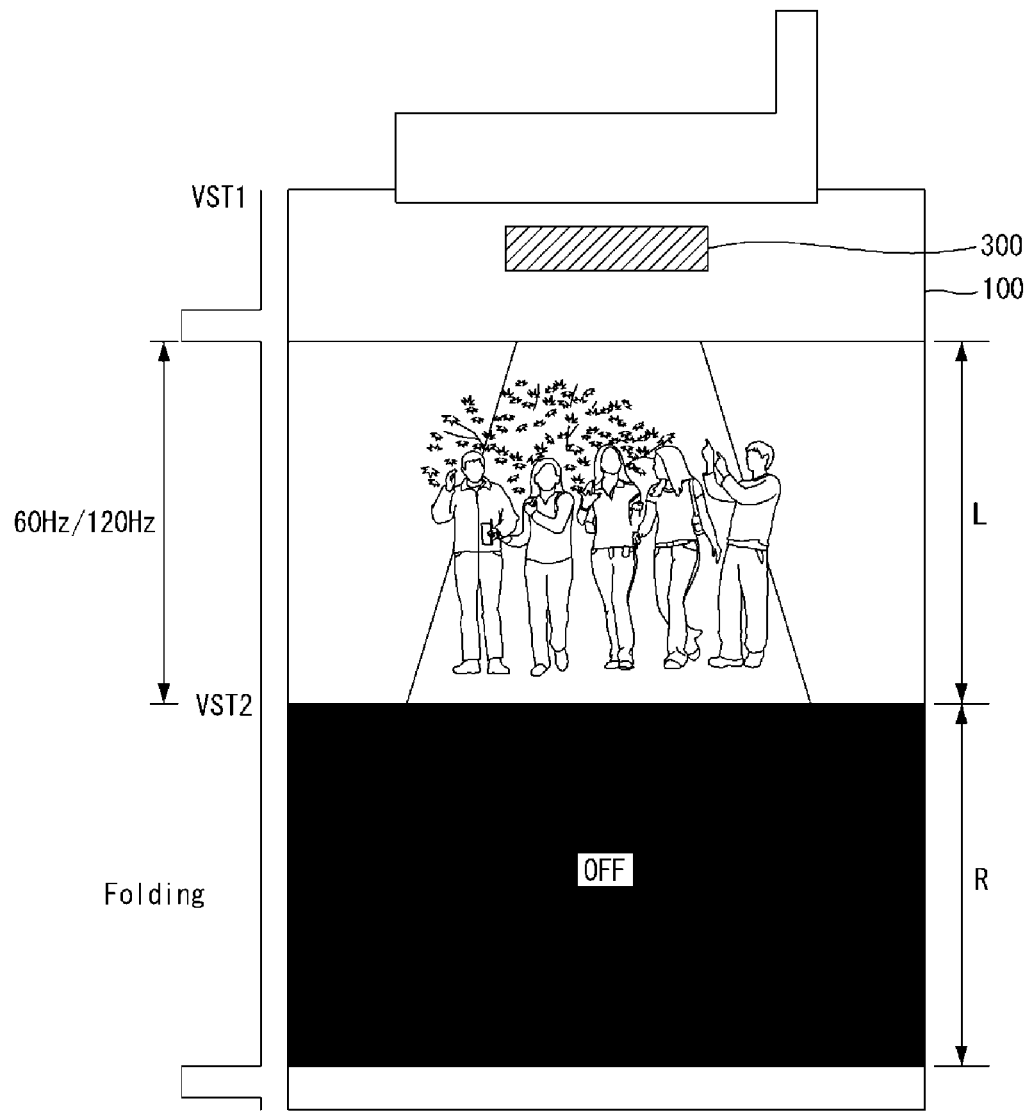
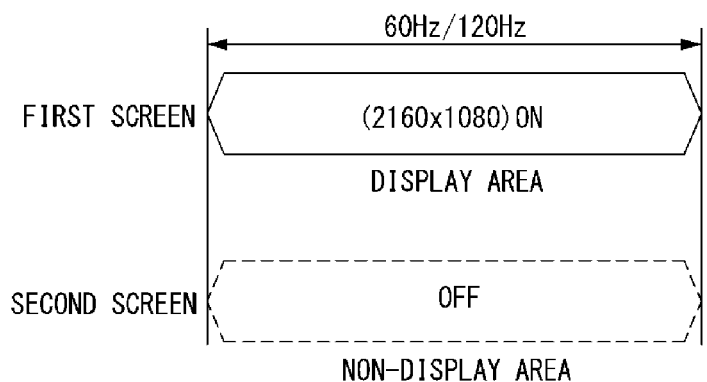

FIG. 16B
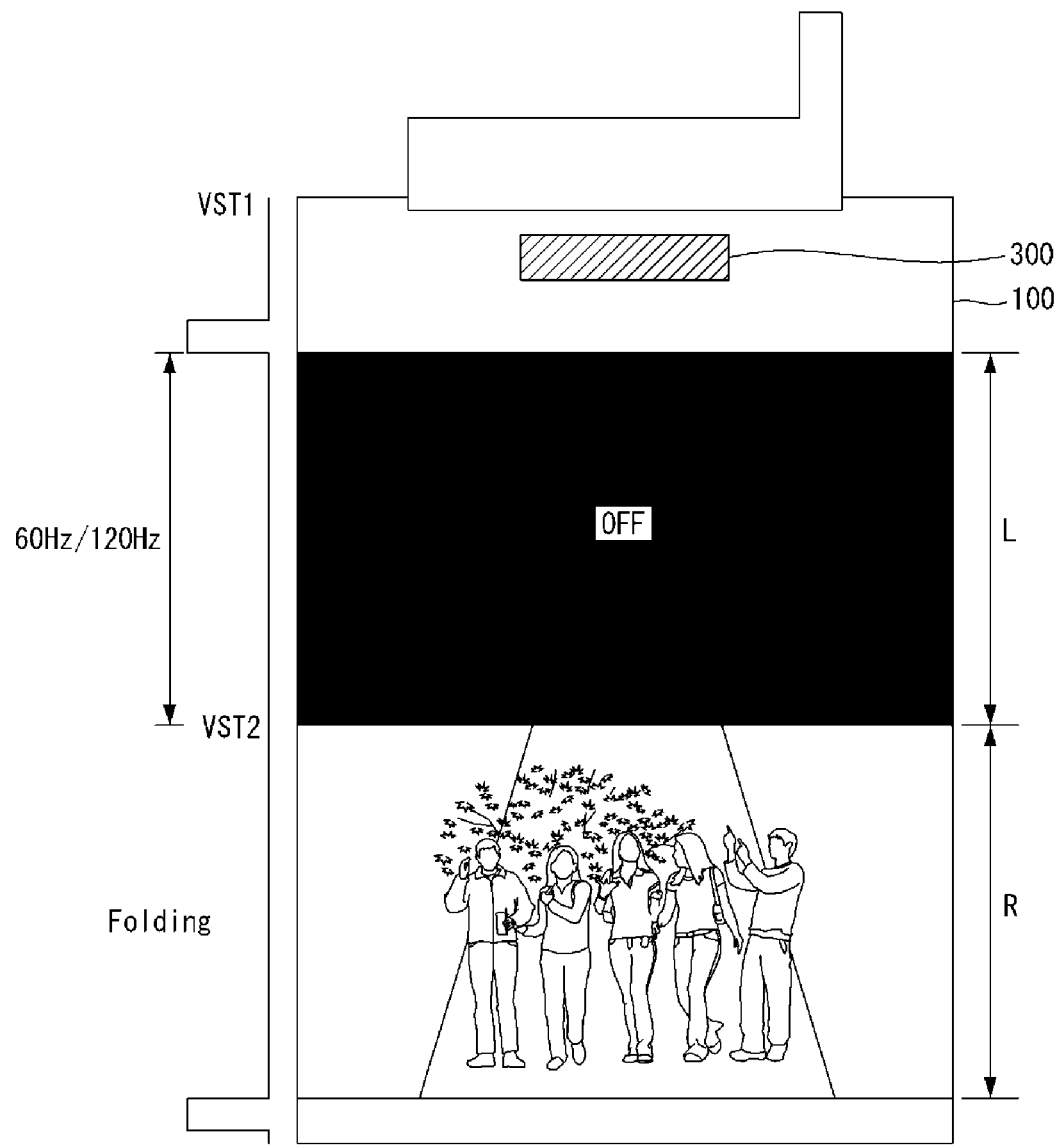
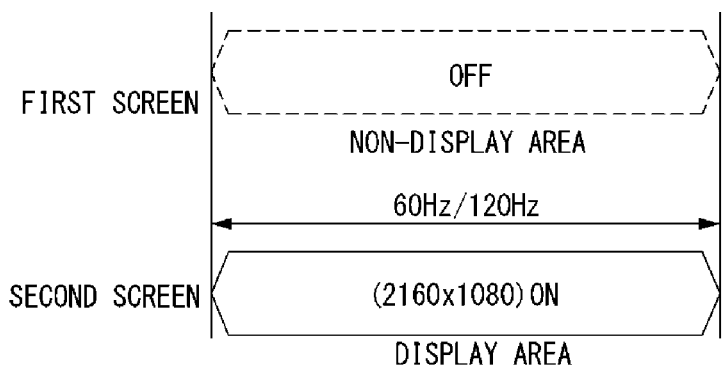

FIG. 17
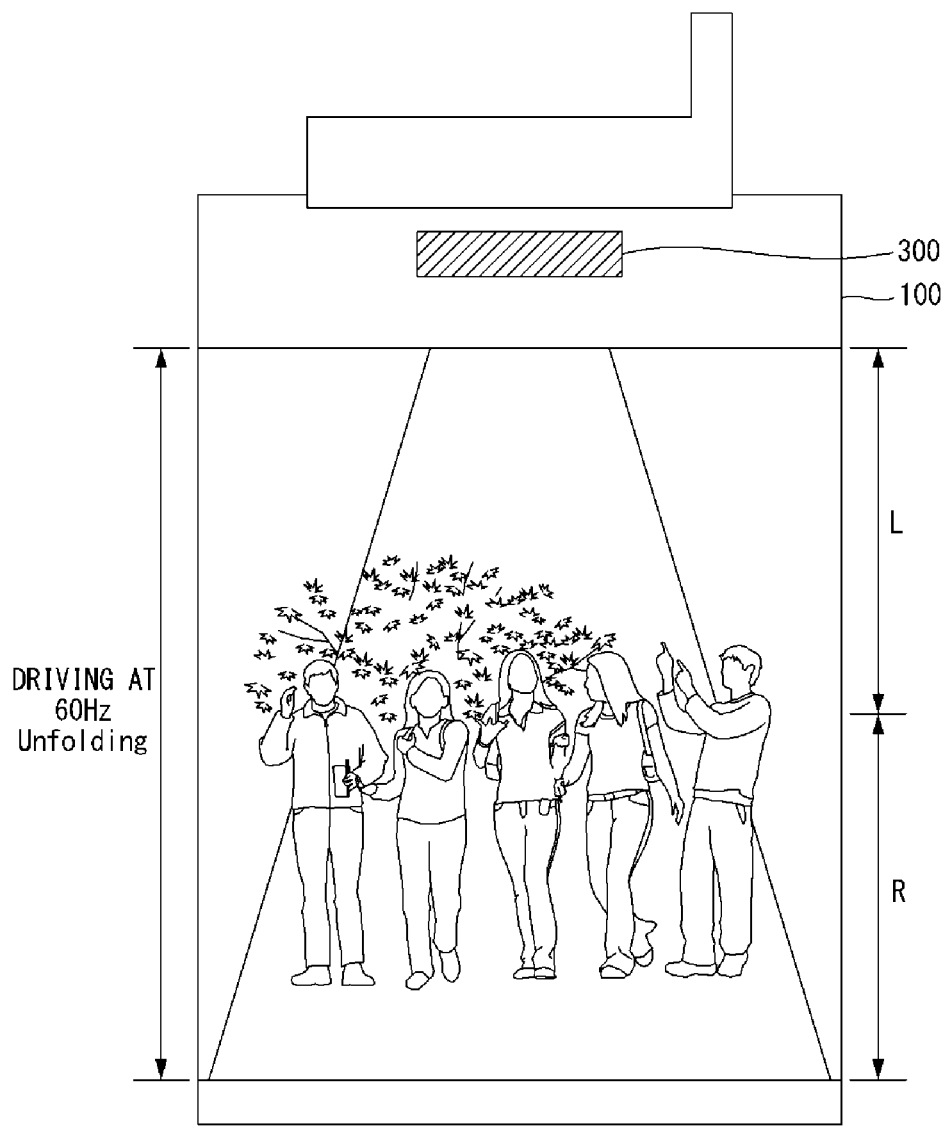
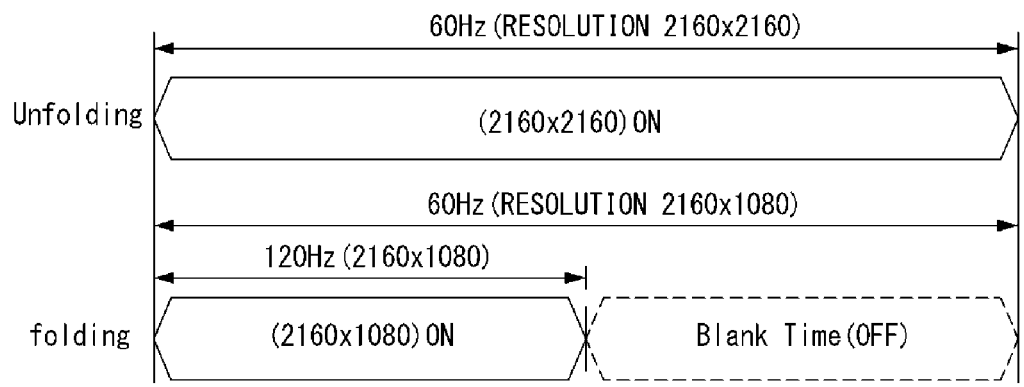

FIG. 40
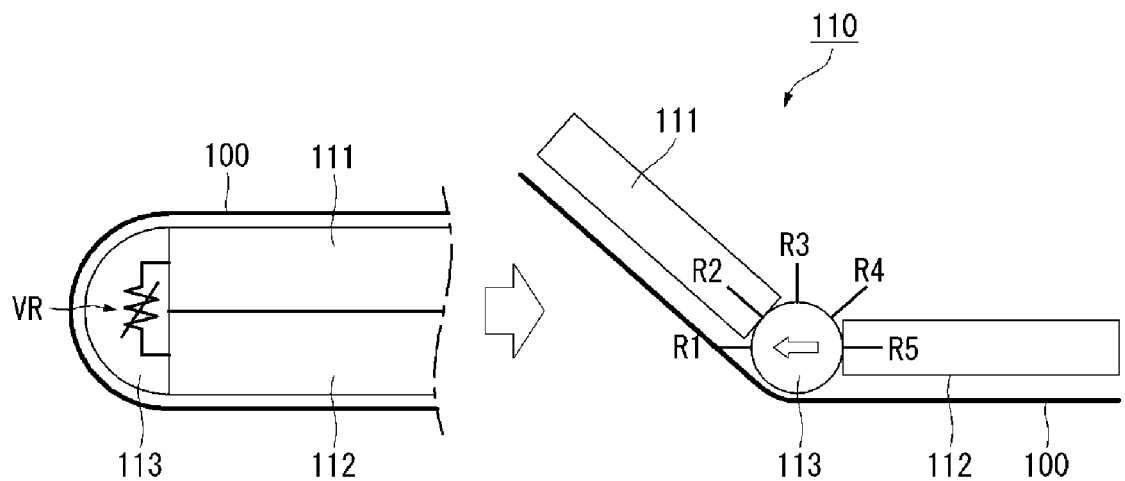
(a)
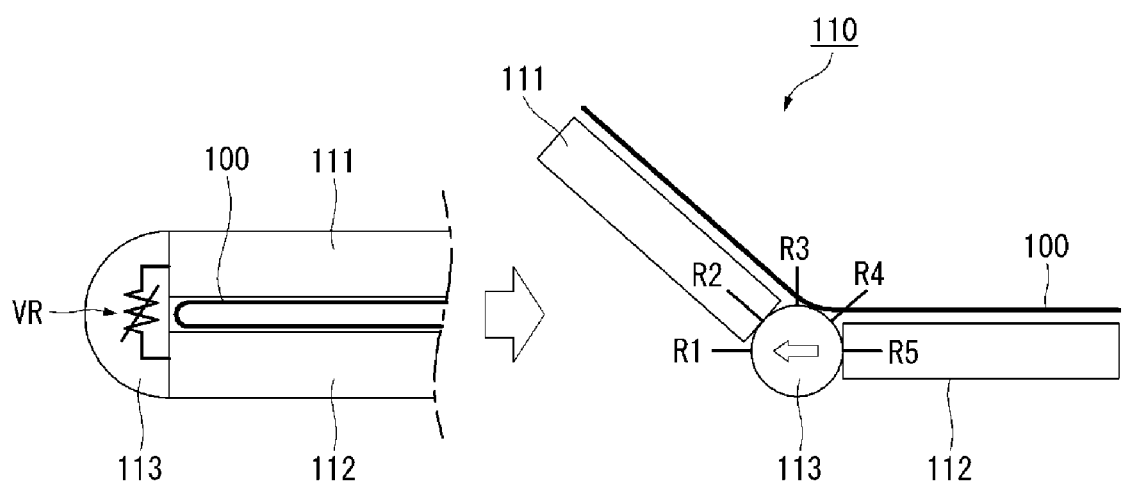
(b)

FOLDABLE DISPLAY AND DRIVING METHOD THEREOF

CROSS REFERENCE TO RELATED APPLICATION

This application claims priority to and the benefit of Korean Patent Application No. 10-2019-0069623, filed Jun. 12, 2019, which is hereby incorporated by reference in its entirety.

BACKGROUND

Field of the Disclosure

The present disclosure relates to a foldable display having a screen that can be foldable by using a flexible display panel, and a driving method thereof.

Description of the Background

Electroluminescent display devices are roughly classified into inorganic light emitting display devices and organic light emitting display devices according to materials of light emitting layers. Active matrix type organic light emitting display devices include organic light emitting diodes (hereinafter referred to as "OLEDs"), which emit light by themselves and have fast response speeds and advantages in which light emission efficiencies, brightness, and viewing angles are high. In the organic light emitting display devices, the OLEDs are formed in pixels. Since the organic light emitting display devices have fast response speeds and are excellent in light emission efficiency, brightness, and viewing angle as well as capable of exhibiting a gray scale value in a full black color, the organic light emitting display devices are excellent in a contrast ratio and color reproducibility.

The organic light emitting display devices do not require backlight units and may be implemented on a plastic substrate, a thin glass substrate, or a metal substrate, which is made of a flexible material. Therefore, flexible displays may be implemented as the organic light emitting display devices.

A screen size of the flexible display may be varied by winding, folding, and bending a flexible display panel. The flexible display may be implemented as a rollable display, a bendable display, a foldable display, a slidable display, or the like. The flexible display devices may be applied not only to mobile devices such as smartphones and tablet personal computers (PCs), but also to televisions (TVs), vehicle displays, and wearable devices, and application fields of the flexible display device are expanding.

The screen size of the foldable display may be varied by folding or unfolding a large screen. An information device employing a foldable display has a problem in that power consumption is greater than that of a conventional mobile device due to a large screen. For example, since a foldable phone employs a foldable display of 7 inches or more, a load of a display panel increases 5.7 times as compared to that of the existing smart phone, and thus power consumption increases largely. The increase in power consumption causes a reduction in battery lifetime. Consequently, the foldable phone requires a battery which is much larger in capacity than that of the existing smart phone.

When the foldable display is being unfolded or folded, all screens display black and then a screen is switched. Therefore, during a screen switching process when the foldable display is being unfolded or folded, a user may recognize flickering of the screen and feel fatigue of the eyes.

SUMMARY

The present disclosure is directed to solving all the above-described necessity and problems.

It should be noted that the present disclosure are not limited to the above-described objectives and will be apparent to those skilled in the art from the following descriptions.

According to an aspect of the present disclosure, there is provided a foldable display including a flexible display panel having a screen which displays an image, a measuring part configured to measure a folding angle of the flexible display panel, and an image processor configured to vary a size of the image on the screen and a size of a black pattern displayed on the screen of the flexible display panel while the folding angle of the flexible display panel is varied.

According to another aspect of the present disclosure, there is provided a method of driving a foldable display, which includes measuring a folding angle of a flexible display panel, and varying a size of an image and a size of a black pattern displayed on the screen of the flexible display panel while the folding angle of the flexible display panel is varied.

According to a further aspect of the present disclosure, there is a foldable display comprising a flexible display panel including a screen which displays an image; a measuring part configured to measure a folding angle of the flexible display panel; and an image processor configured to vary a size of the image displayed on the screen and a size of a black pattern displayed on the screen of the flexible display panel while the folding angle of the flexible display panel is varied, a display panel driver configured to activate an entire screen of the flexible display panel to display the image on a maximum screen when the flexible display panel is in an unfolded state and activate a part of the screen when the flexible display panel is in a folded state to display the image on an activated screen and display the black pattern on a non-activated screen; and a gate driver divided into two or more gate drivers and driving a screen without applying data voltages to pixels of the non-activated screen in the folded state of the foldable display.

It is to be understood that both the foregoing general description and the following detailed description are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure.

In the drawings:

FIG. 11 is a diagram illustrating first and second shift registers of the gate driver;

FIG. 16A is a diagram illustrating screens in a folded state on the foldable display of the present disclosure;

FIG. 16B is a diagram illustrating screens in a folded state on the foldable display of the present disclosure;

FIG. 17 is a diagram illustrating a screen in an unfolded state on the foldable display of the present disclosure;

FIG. 40 is a diagram illustrating a resistance measuring device according to another aspect of the present disclosure.

DETAILED DESCRIPTION

Figure 1:
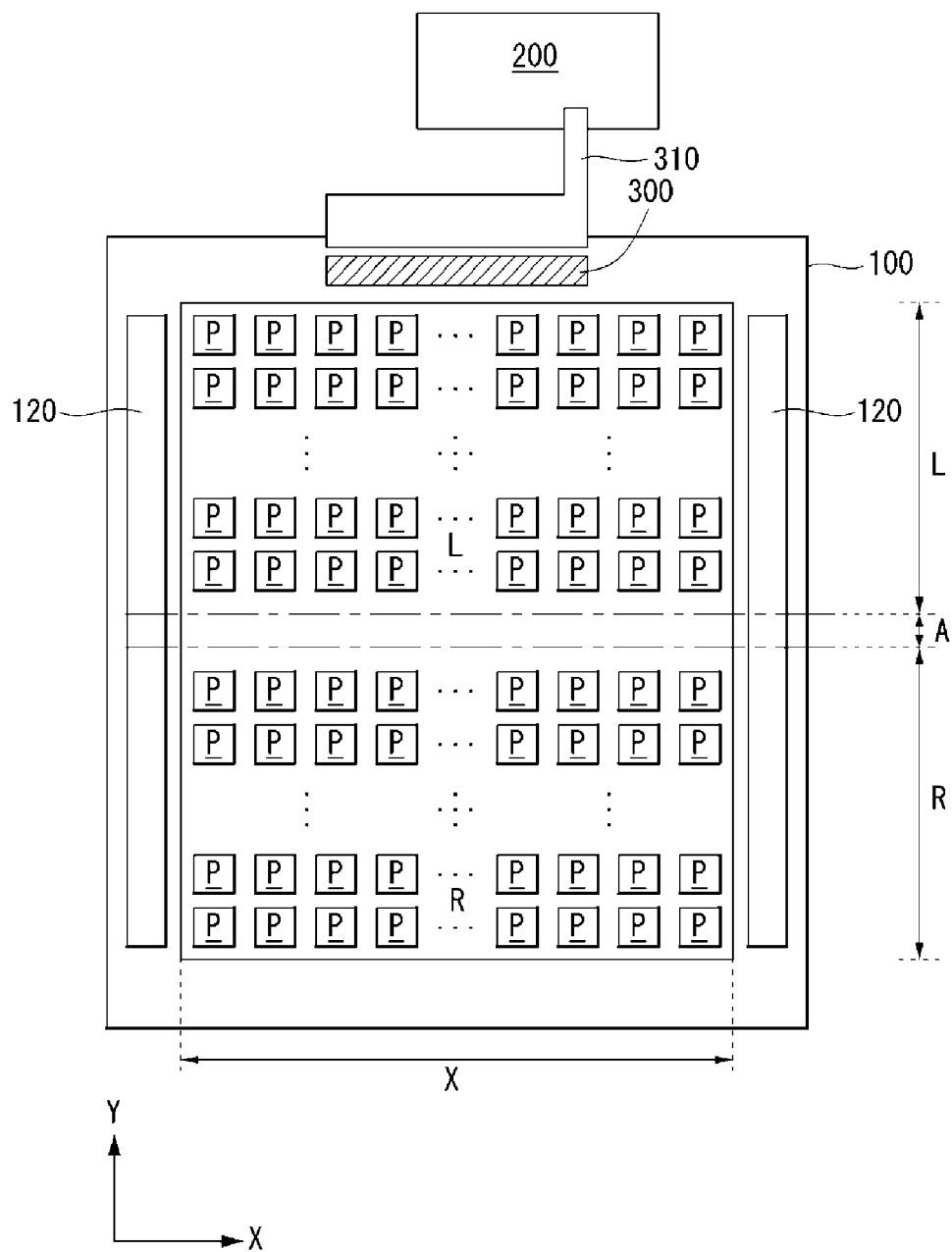
FIG. 1 is a block diagram illustrating a foldable display according to one aspect of the present disclosure.

Advantages, features, and implementations thereof will be apparent from aspects which are described in detail below together with the accompanying drawings. The present disclosure may, however, be implemented in many different forms and should not be construed as being limited to the aspects set forth herein, and the aspects are provided such that this disclosure will be thorough and complete and will fully convey the scope of the present disclosure to those skilled in the art to which the present disclosure pertains, and the present disclosure is defined by only the scope of the appended claims.

Shapes, sizes, ratios, angles, numbers, and the like disclosed in the drawings for describing the aspects of the present disclosure are illustrative, and thus the present disclosure is not limited to the illustrated matters. The same reference numerals refer to the same components throughout this disclosure. Further, in the following description of the present disclosure, when a detailed description of a known related art is determined to unnecessarily obscure the gist of the present disclosure, the detailed description thereof will be omitted herein. When the terms "including," "having," "consisting of," and the like mentioned in this disclosure are used, other parts may be added unless the term "only" is used herein. When a component is expressed as a singular number, the plural number is included unless otherwise specified.

In analyzing a component, it is interpreted as including an error range even when there is no explicit description.

In describing a positional relationship, for example, when a positional relationship of two parts is described as being "on," "above," "below, "next to," or the like, unless "immediately" or "directly" is used, one or more other parts may be located between the two parts.

In describing the aspects, although the terms first, second, and the like are used to describe various components, these components are not substantially limited by these terms. These terms are used only to distinguish one component from another component. Therefore, a first component described below may substantially be a second component within the technical spirit of the present disclosure.

The same reference numerals refer to the same components throughout this disclosure.

Features of various aspects of the present disclosure may be partially or entirely coupled or combined with each other and may technically be various interlocking and driving, and the aspects may be independently implemented with respect to each other or implemented together with a correlation.

In a foldable display of the present disclosure, each of a pixel circuit and a gate driver may include a plurality of transistors. The transistors may be implemented as oxide thin film transistors (TFTs) including oxide semiconductors, low temperature poly silicon (LTPS) TFTs including LTPSs, and the like. Each of the transistors may be implemented as a p-channel TFT or an n-channel TFT. In the aspect, the transistors of a pixel circuit are mainly described as an example implemented as p-channel TFTs, but the present disclosure is not limited thereto.

The transistor is a three-electrode element including a gate, a source, and a drain. The source is an electrode for supplying a carrier to the transistor. In the transistor, the carries begins to flow from the source. The drain is an electrode in which the carrier is discharged from the transistor to the outside. In the transistor, the carrier flows from the source to the drain. In the case of an n-channel transistor, since the carrier is an electron, a source voltage is lower than a drain voltage so as to allow electrons to flow from the source to the drain. In the n-channel transistor, a current flows in a direction from the drain to the source. In the case of a p-channel transistor (a p-type metal oxide semiconductor (PMOS)), since the carrier is a hole, the source voltage is higher than the drain voltage so as to allow holes to flow from the source to the drain. In the p-channel transistor, since the holes flow from the source to the drain, a current flows from the source to the drain. It should be noted that the source and the drain of the transistor are not fixed. For example, the source and the drain may be changed according to an applied voltage. Therefore, the present disclosure is not limited due to the source and the drain of the transistor. In the following description, the source and the drain of the transistor will be referred to as a first electrode and a second electrode, respectively.

A gate signal swings between a gate on voltage and a gate off voltage. The gate on voltage is set to a voltage that is higher than a threshold voltage of the transistor, and the gate off voltage is set to a voltage that is lower than the threshold voltage of the transistor. The transistor is turned on in response to the gate on voltage, whereas the transistor is turned off in response to the gate off voltage. In the case of the n-channel transistor, the gate on voltage may be a gate high voltage (VGH), and the gate off voltage may be a gate low voltage (VGL). In the case of the p-channel transistor, the gate on voltage may be the VGL, and the gate off voltage may be the VGH.

In the following description of aspects, a screen is a screen which is foldable using a flexible display panel and means a screen of which a resolution and a size are varied in a folded state and an unfolded state. In the folded state in which the flexible display panel is folded, a portion of the screen is activated, whereas the remaining portion thereof is non-activated. Pixels in the activated screen display an input image. Pixels in the non-activated screen display a gray scale value corresponding to a black color. The activated screen is a display area in examples of FIGS. 16A and 16B. The non-activated screen is a non-display area which displays black in the examples of FIGS. 16A and 16B.

According to the present disclosure, while a folding angle of the flexible display panel is varied, a size of an image displayed on the screen and a size of a black color area (or black pattern) displayed on the screen of the flexible display panel are varied. The black color area is displayed on a non-activated screen which displays a gray scale value corresponding to the black color. Therefore, the size of the black pattern is equal to that of the non-activated screen which is varied according to a folding angle of the flexible display panel.

The folding angle of the flexible display panel may be measured in real time on the basis of resistance of a line formed on the flexible display panel or a resistance of a support for supporting the flexible display panel.

Hereinafter, various aspects of the present disclosure will be described in detail with reference to the accompanying drawings.

Referring to FIGS. 1 to 6, a foldable display of the present disclosure includes a flexible display panel 100 and display panel drivers 120 and 300.

When the flexible display panel 100 is unfolded, the display panel drivers 120 and 300 activate all screens of the flexible display panel 100 to display an image on a maximum screen. When the flexible display panel 100 is folded, the display panel drivers 120 and 300 activate a part of all the screens to display an image on a screen that is smaller than the maximum screen and display black on a non-activated screen.

Figure 6:
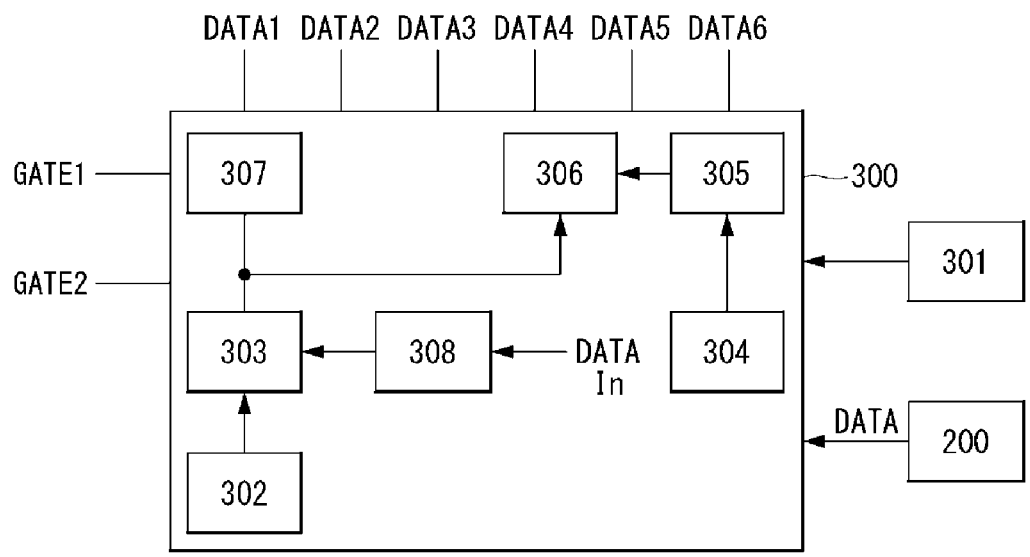
FIG. 6 is a block diagram illustrating a configuration of a drive integrated circuit (IC)

As shown in FIGS. 1 and 6, the display panel drivers 120 and 300 include a gate driver 120 for supplying gate signals to gate lines GL1 and GL2 of the flexible display panel 100, a data driver 306 for converting pixel data into a voltage of a data signal and supplying the voltage to data lines through activated data output channels, and a timing controller 303 for activating data output channels of the data driver 306 according to a folding angle of the flexible display panel and controlling an operating timing of the data driver 306 and the gate driver 120. The data driver 306 and the timing controller 303 may be integrated in a drive integrated circuit (IC) 300.

In the flexible display panel 100, a screen which reproduces an input image includes data lines DL1 to DL6, the gate lines GL1 and GL2 crossing the data lines DL1 to DL6, and a pixel array in which pixels P are disposed in the form of a matrix. The screen is at least divided into a first screen L and a second screen R. A folding boundary A is present between the first screen L and the second screen R. The screen of the flexible display panel 100 may include a plurality of folding boundaries A to be folded in various forms.

Figure 2A:
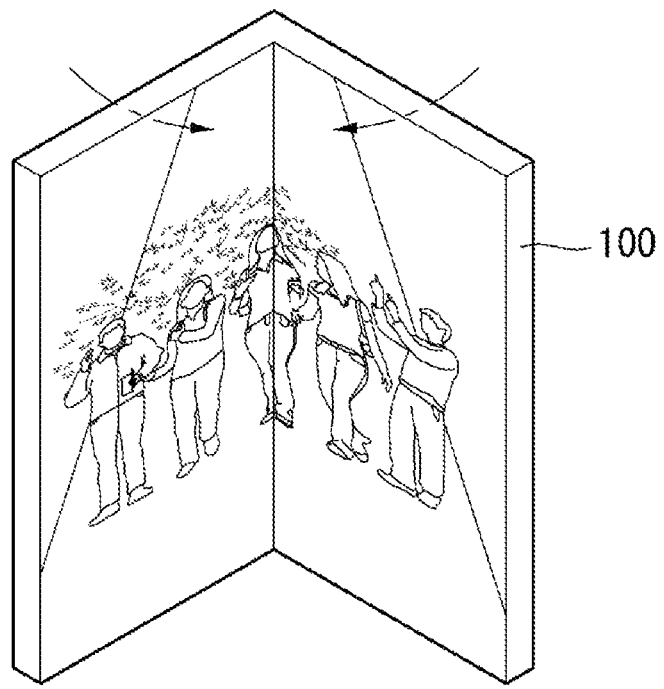
FIG. 2A is a diagram illustrating examples in which the foldable display is folded.
Figure 2B:
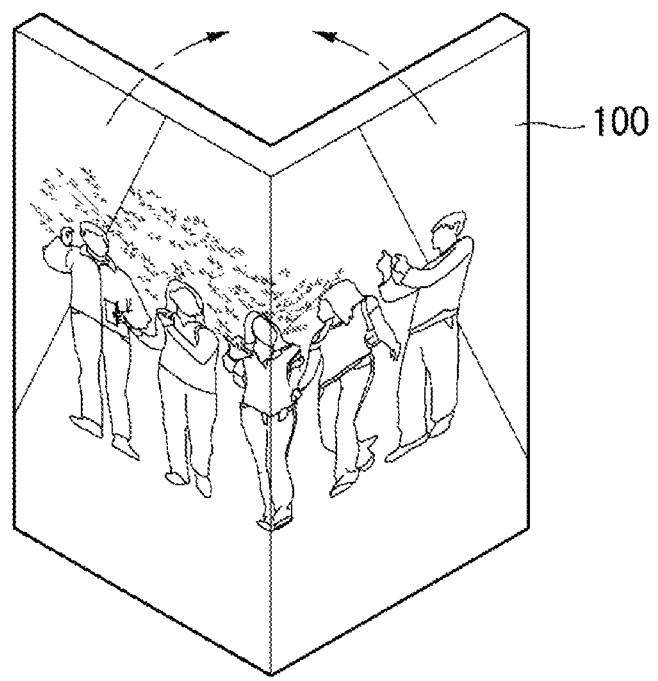
FIG. 2B is a diagram illustrating examples in which the foldable display is folded.
Figure 3:
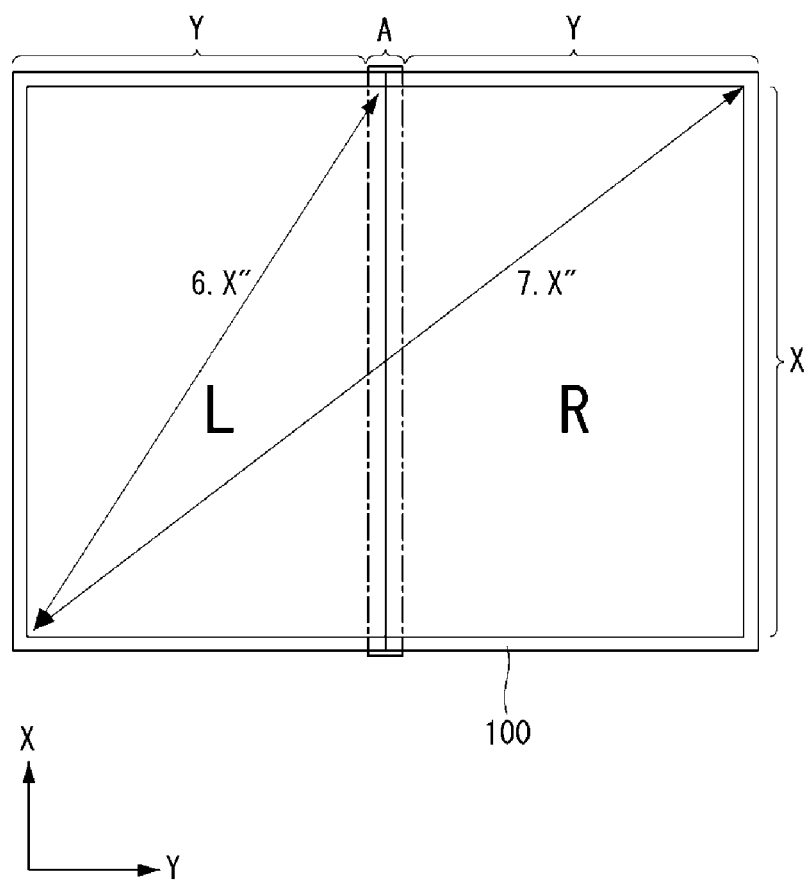
FIG. 3 is a diagram illustrating an example in which a screen size of a flexible display panel is varied.

As shown in FIGS. 2A and 2B, the flexible display panel 100 may be folded with respect to the folding boundary A as a boundary. The first screen L, the second screen R, and the folding boundary A are selectively driven according to folded/unfolded states, a folding angle, and the like of the flexible display panel 100, and thus a size and a resolution of an activated screen displaying an image or information may be varied.

The timing controller 303 may determine a folded or unfolded state of the flexible display panel 100 on the basis of an enable signal EN from a host system 200 and further determine a folding angle of the flexible display panel 100. The timing controller 303 may control a size and a resolution of an activated screen in the unfolded state of the flexible display panel 100 as a maximum screen and a maximum resolution thereof. In the unfolded state of the screen, the first screen L is substantially coplanar with the second screen R.

The flexible display panel 100 may be folded in an in-folding method shown in FIG. 2A or an out-folding method shown in FIG. 2B. In the in-folding method, the first screen L is brought into contact with the second screen R inside the folded flexible display panel 100. In the in-folding method, since the first screen L and the second screen R are disposed inside the folded flexible display panel 100, the first screen L and the second screen R are not exposed to the outside.

In the out-folding method, the flexible display panel 100 is folded in the form in which the first screen L and the second screen R are back to back. Thus, when the out-folding type foldable display is folded, the first screen L and the second screen R are exposed to the outside.

When the first screen L and the second screen R are folded with respect to the folding boundary A as a boundary, a resolution of one driven surface may be X*Y or X*(Y+A). The first screen L may be an upper half portion or a left half portion of the screen, and the second screen R may be a lower half portion or a right half portion of the screen.

The folding boundary A is a screen between the first screen L and the second screen R. An input image or information may also be displayed on pixels P of the folding boundary A. Since the pixels P are disposed in the folding boundary A, in the unfolded state in which the first screen L and the second screen R are unfolded, a portion in which an image is discontinued is not present between the first screen L and the second screen R. A width of the folding boundary A, that is, a length in a Y-axis, is determined according to a curvature of the folding boundary A. A curvature of the folding boundary A is varied according to a folding angle of the flexible display panel 100. A resolution and a size of the folding boundary A are proportional to a radius of curvature of the folding boundary A.

In FIG. 1, X is an X-axis resolution of the screens L, A, and R. L+A+R is a Y-axis resolution of the screens L, A, and R.

When the flexible display panel 100 is unfolded and all of the first screen L, the second screen R, and the folding boundary A are driven, the sizes and the resolution of the screens L, A, and R are maximized. When the flexible display panel 100 is folded in half with respect to the folding boundary A and either the first screen L or the second screen R is driven, the size and the resolution of the screen are reduced. For example, when either the first screen L or the second screen R is driven, a size of an activated screen which displays an image may be reduced to 6 inches (6.x") and a resolution of the screen may be 2160*1080. Meanwhile, when all the screens L, A, and R are driven, a size of a screen which displays an image may be increased 7 inches (7.x") and a resolution of the screen may be increased to 2160*2160.

Figure 7A:
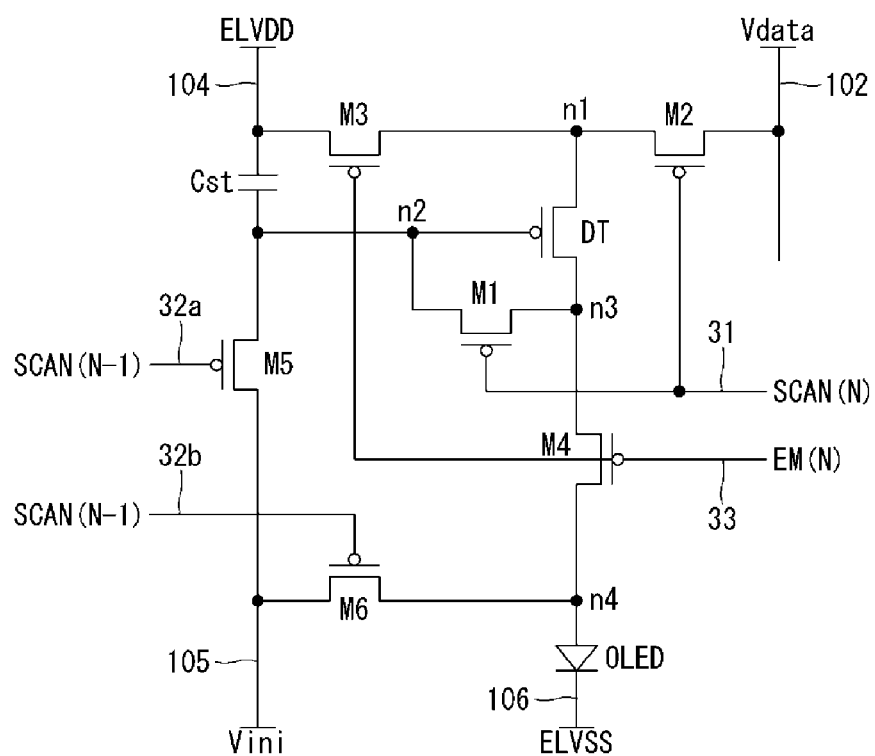
FIG. 7A is a circuit diagram illustrating an example of a pixel circuit.

In order to implement colors, each of the pixels P includes sub-pixels having different colors. The sub-pixels include red (hereinafter referred to as an "R sub-pixel"), green (hereinafter referred to as a "G sub-pixel"), and blue (hereinafter referred to as a "B sub-pixel"). Although not shown in the drawings, a white sub-pixel may be further included. As shown in FIG. 7A, each of the sub-pixels may be implemented as a pixel circuit including an internal compensation circuit.

Figure 4:
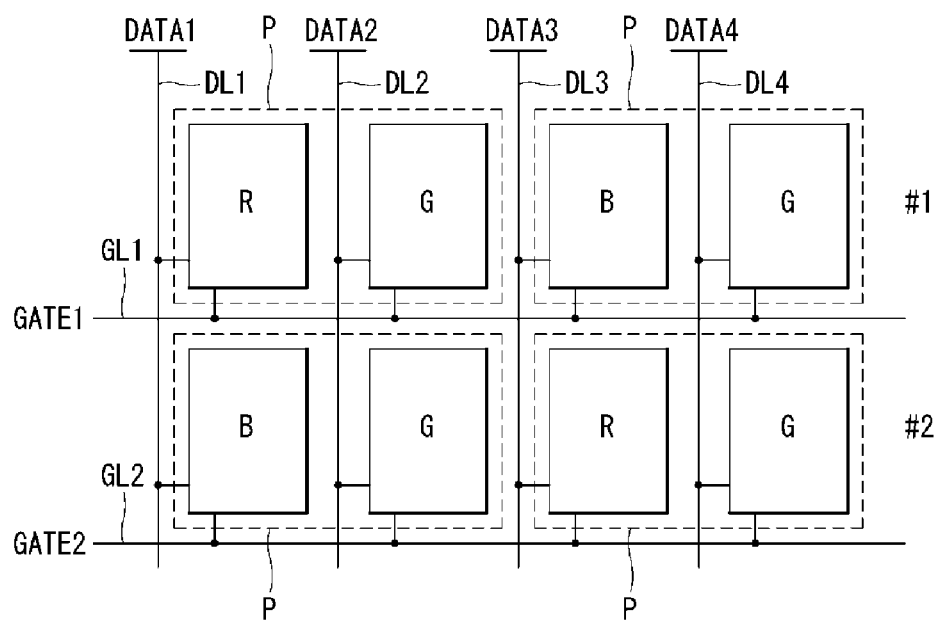
FIG. 4 is a diagram illustrating an example of a pentile pixel arrangement.

The pixels P may be disposed as real color pixels and pentile pixels. As shown in FIG. 4, the pentile pixel may drive two sub-pixels having different colors as one pixel P using a preset pentile pixel rendering algorithm to implement a resolution that is higher than that of the real color pixel. The pentile pixel rendering algorithm compensates for a color expression, which is insufficient in each of the pixels P, with a color of light emitted from pixels adjacent thereto.

Figure 5:
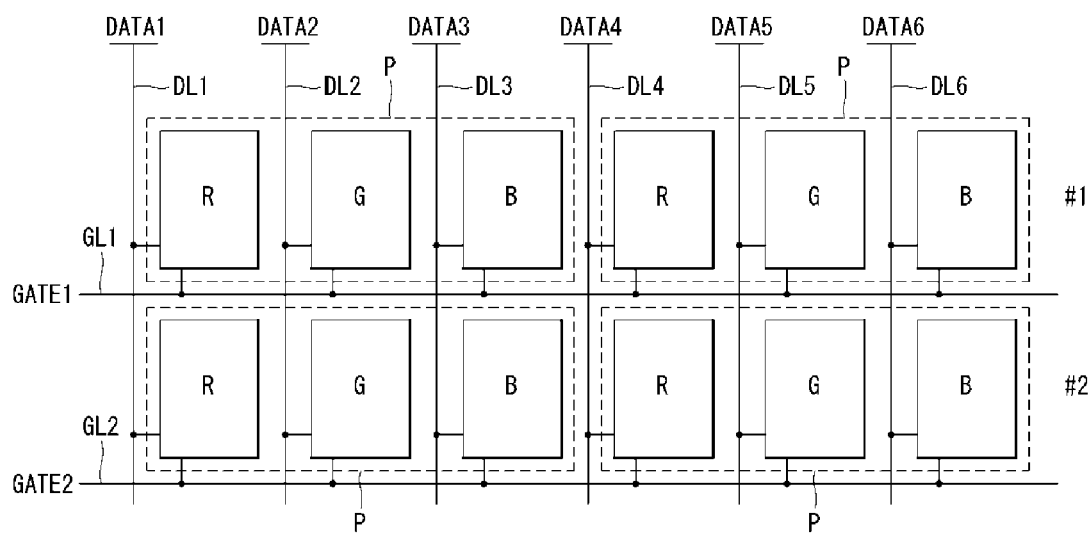
FIG. 5 is a diagram illustrating an example of a real pixel arrangement.

As shown in FIG. 5, in the case of the real color pixel, one pixel P includes R, G and B sub-pixels.

In FIGS. 4 and 5, when a resolution of a pixel array is n*m, the pixel array includes n pixel columns and m pixel lines crossing the n pixel columns. The pixel column includes pixels disposed in a Y-axis direction. The pixel line includes pixels disposed in an X-axis direction. One horizontal time 1H is a time obtained by dividing one frame interval by the m pixel lines.

The flexible display panel 100 may be implemented as a plastic organic light emitting diode (OLED) panel. The plastic OLED panel includes a pixel array on an organic thin film bonded to a back plate. A touch sensor array may be formed on the pixel array.

The back plate may be a polyethylene terephthalate (PET) substrate. An organic thin film is formed on the back plate. A pixel array and a touch sensor array may be formed on the organic thin film. In order to prevent the pixel array from being exposed to humidity, the back plate blocks moisture permeation toward the organic thin film. The organic thin film may be a thin polyimide (PI) film substrate. A multi-layer buffer film may be formed of an insulating material (not shown) on the organic thin film. Lines for supplying power or signals applied to the pixel array and the touch sensor array may be formed on the organic thin film.

As shown in FIG. 7A, in the plastic OLED panel, the pixel circuit includes an OLED used as a light emitting element, a drive element for driving the OLED, a plurality of switching elements for switching current paths between the drive element and the OLED, and a capacitor connected to the drive element.

A drive IC 300 drives a pixel array of the screens L, A, and R displaying an image or information. As shown in FIG. 4 or 5, in the pixel array, the data lines DL1 to DL6 cross the gate lines GL1 and GL2. The pixel array includes pixels P disposed in the form of a matrix which is defined by the data lines DL1 to DL6 and the gate lines GL1 and GL2.

The gate driver 120 may be mounted on a substrate of the flexible display panel 100 together with the pixel array. The gate driver 120 may be implemented as a gate in panel (GIP) circuit which is directly formed on the flexible display panel 100.

The gate driver 120 may be disposed on one of a left bezel and a right bezel of the flexible display panel 100 to supply gate signals to the gate lines GL1 and GL2 in a single feeding manner. In this case, one of the two gate drivers 120 in FIG. 1 is not necessary.

The gate driver 120 may be disposed on each of the left bezel and the right bezel of the flexible display panel 100 to supply gate signals to the gate lines GL1 and GL2 in a double feeding manner. In the double feeding manner, the gate signals are simultaneously applied at both ends of one gate line.

Figure 7B:
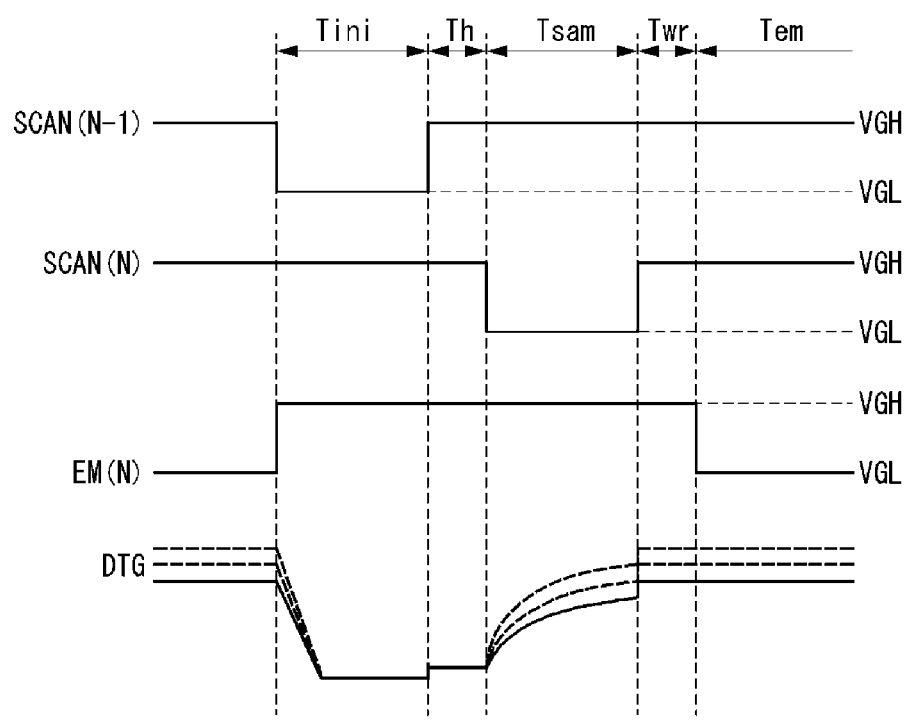
FIG. 7B is a diagram illustrating a method of driving the pixel circuit shown in FIG. 7A.

The gate driver 120 is driven according to a gate timing signal supplied from the drive IC 300 using a shift register to sequentially supply gate signals GATE1 and GATE2 to the gate lines GL1 and GL2. The shift register may sequentially supply the gate signals GATE1 and GATE2 to the gate lines GL1 and GL2 by shifting the gate signals GATE1 and GATE2. The gate signals GATE1 and GATE2 may include scan signals SCAN(N−1) and SCAN(N), a light emission control signal EM(N), and the like which are shown in FIGS. 7A and 7B. Hereinafter, the "light emission control signal" is referred to as an EM signal.

The drive IC 300 is connected to the data lines DL1 to DL6 through data output channels to supply the voltage of the data signal to the data lines DL1 to DL6. The drive IC 300 may output gate timing signals for controlling the gate drivers 120 through the gate timing signal output channels.

The drive IC 300 is connected to the host system 200, a first memory 301, and the flexible display panel 100. As shown in FIG. 6, the drive IC 300 includes a data receiving and calculating part 308, the timing controller 303, and the data driver 306.

The drive IC 300 may further include a gamma compensation voltage generator 305, a power supply 304, a second memory 302, and a level shifter 307.

The drive IC 300 may generate the gate timing signals for driving the gate driver 120 through the timing controller 303 and the level shifter 307. The gate timing signal includes gate timing signals such as a gate start pulse VST and a gate shift clock CLK, and gate voltages such as a gate-on voltage VGL and a gate-off voltage VGH. The gate start pulse VST and the gate shift clock CLK swing between the gate-on voltage VGL and the gate-off voltage VGH.

The data receiving and calculating part 308 includes a receiver RX for receiving pixel data which is input as a digital signal from the host system 200, and a data calculator for processing the pixel data input through the receiver RX to improve image quality. The data calculator may include a data restoration part for decoding and restoring compressed pixel data and an optical compensator for adding a predetermined optical compensation value to the pixel data. The optical compensation value may be set to a value for correcting brightness of the pixel data on the basis of brightness of the screen measured based on a camera image which is captured in a manufacturing process.

The timing controller 303 provides the data driver 306 with pixel data of an input image received from the host system 200. The timing controller 303 generates a gate timing signal for controlling the gate driver 120 and a source timing signal for controlling the data driver 306 to control operation timings of the gate driver 120 and the data driver 306.

The data driver 306 converts the pixel data (a digital signal) received from the timing controller 303 into a gamma compensation voltage through a digital-to-analog converter (DAC) to provide voltages of data signals DATA1 to DATA6 (hereinafter referred to as "data voltages"). The data voltages output from the data driver 306 are supplied to the data lines DL1 to DL6 of the pixel array through an output buffer (a source amplifier (AMP)) connected to data channels of the drive IC 300.

The gamma compensation voltage generator 305 distributes a gamma reference voltage from the power supply 304 through a voltage divider circuit to generate a gamma compensation voltage for each gradation. The gamma compensation voltage is an analog voltage in which a voltage is set for each gradation of the pixel data. The gamma compensation voltage output from the gamma compensation voltage generator 305 is provided to the data driver 306.

The level shifter 307 converts a low level voltage of the gate timing signal received from the timing controller 303 into the gate-on voltage VGL and converts a high level voltage of the gate timing signal into the gate-off voltage VGH. The level shifter 307 outputs the gate timing signal VGH and the gate voltages VGL through the gate timing signal output channels and supplies the gate timing signal VGH and the gate voltages VGL to the gate driver 120.

The power supply 304 generates power required for driving the pixel array, the gate driver 120, and the drive IC 300 of the flexible display panel 100 using a direct current (DC)-DC converter. The DC-DC converter may include a charge pump, a regulator, a buck converter, and a boost converter. The power supply 304 may adjust a DC input voltage from the host system 200 to generate DC power such as a gamma reference voltage, the gate-on voltage VGL, the gate-off voltage VGH, a pixel driving voltage ELVDD, a low potential power voltage ELVSS, and an initialization voltage Vini. The gamma reference voltage is supplied to the gamma compensation voltage generator 305. The gate-on voltage VGL and the gate-off voltage VGH are supplied to the level shifter 307 and the gate driver 120. Pixel power, such as the pixel driving voltage ELVDD, the low potential power voltage ELVSS, and the initialization voltage Vini, are commonly supplied to the pixels P.

The gate voltages may be set to VGH=8 V and VGL=−7 V, and the pixel power may be set to ELVDD=4.6 V, ELVSS=−2 to −3 V, and Vini=−3 to −4 V, but the present disclosure is not limited thereto. A data voltage Vdata may be set to Vdata=3 to 6 V, but the present disclosure is not limited thereto.

Vini is set to a DC voltage that is lower than the ELVDD and a threshold voltage of a light emitting element OLED to suppress light emission of the light emitting element OLED. Vini may be continuously applied to an anode of the light emitting element OLED for one frame interval or more in a non-activated pixel. The light emitting element OLED is initialized when Vini is applied to the anode.

When power is supplied to the drive IC 300, the second memory 302 stores a compensation value, register setting data, and the like which are received from the first memory 301. The compensation value may be applied to various algorithms for improving image quality. The compensation value may include an optical compensation value.

The register setting data defines operations of the data driver 306, the timing controller 303, and the gamma compensation voltage generator 305. The first memory 301 may include a flash memory. The second memory 302 may include a static random access memory (SRAM).

The host system 200 may be implemented as an application processor (AP). The host system 200 may transmit pixel data of an input image to the drive IC 300 through a mobile industry processor interface (MIPI). The host system 200 may be connected to the drive IC 300 through a flexible printed circuit, for example, a flexible printed circuit (FPC) 310.

The host system 200 may output an enable signal EN for controlling driving of the drive IC 300 according to whether the flexible display panel 100 is folded. The enable signal EN may include information on whether the flexible display panel 100 is folded and information indicating a folding angle.

The host system 200 may detect an attitude variation of the foldable display using a tilt sensor. In response to an output signal of the tilt sensor, the host system 200 may control the drive IC 300 to control each of the first screen L and the second screen R to be turned ON/OFF. The tilt sensor may include a gyro sensor or an acceleration sensor. The host system 200 may transmit tilt information of the foldable display panel to the drive IC 300. In response to an output signal of the acceleration sensor, the host system 200 may control the drive IC 300.

When the user folds the foldable display and looks at the first screen L, under the control of the host system 200, the drive IC 300 activates the first screen L to display an image on the first screen L, whereas the drive IC 300 deactivates the second screen R at a side opposite the first screen L to control the second screen R as a non-activated screen displaying a black gray scale. On the other hand, when the user folds the foldable display and looks at the second screen R, under the control of the host system 200, the drive IC 300 activates the second screen R to display an image on the second screen R, whereas the drive IC 300 controls the first screen L as a non-activated screen displaying a black gray scale. When the user unfolds the foldable display and looks at the first screen L and the second screen R, under the control of the host system 200, the drive IC 300 activates the first screen L, the folding boundary A, and the second screen R to display an image on all the screens L, A, and R.

A host system 200 or a drive IC 300 may sense the folded state and the unfolded state of the flexible display panel 100 by sensing a variation in resistance value of a flexible display panel 100.

While a folding angle of the flexible display panel is varied, the host system 200 or the drive IC 300 may gradually vary a size of an activated screen which displays an image among all screens L, A, and R, and a size of a non-activated screen which displays a gray scale value corresponding to the black color.

For example, when a state is being switched between the folded state and the unfolded state of the flexible display panel 100, the host system 200 or the drive IC 300 may gradually increase or decrease the size of the non-activated screen which displays the gray scale value corresponding to the black color. When the state is being switched between the folded state and the unfolded state of the flexible display panel 100, the host system 200 or the drive IC 300 may gradually increase or decrease a resolution of the activated screen which displays an image. The resolution of the activated screen and the size of the non-activated screen have a complementary relationship.

FIG. 7A is a circuit diagram illustrating an example of a pixel circuit. FIG. 7B is a diagram illustrating a method of driving the pixel circuit shown in FIG. 7A.

Referring to FIGS. 7A and 7B, the pixel circuit includes the light emitting element OLED, a drive element DT which supplies a current to the light emitting element OLED, and an internal compensation circuit for sampling a threshold voltage Vth of the drive element DT using a plurality of switching elements M1 to M6 to compensate for a gate voltage of the drive element DT by as much as the threshold voltage Vth of the drive element DT. Each of the drive element DT and the switching elements M1 to M6 may be implemented as a p-channel transistor.

An operation of the internal compensation circuit is divided into an initialization time Tini in which fifth and sixth switching elements M5 and M6 are turned on according to a gate-on voltage VGL of an (N−1)th scan signal SCAN(N−1) to initialize the pixel circuit, a sampling time Tsam in which first and second switching elements M1 and M2 are turned on according to a gate-on voltage VGL of an Nth scan signal SCAN(N) to sample the threshold voltage Vth of the drive element DT and store the sampled threshold voltage Vth in a capacitor Cst, a data write time Twr in which the first to sixth switching elements M1 to M6 are maintained in an OFF state, and a light emission time Tem in which third and fourth switching elements M3 and M4 are turned on such that the light emitting element OLED emits light. In the light emission time Tem, in order to precisely express brightness of a low gradation with a duty ratio of the EM signal EM(N), the EM signal EM(N) may swing between the gate-on voltage VGL and the gate-off voltage VGH at a predetermined duty ratio to repeat turning ON/OFF of the third and fourth switching elements M3 and M4.

The light emitting element OLED may be implemented as an organic light emitting diode or an inorganic light emitting diode. Hereinafter, an example in which the light emitting element OLED is implemented as an organic light emitting diode will be described.

The light emitting element OLED may be implemented as an organic compound layer formed between an anode and a cathode as an OLED. The organic compound layer may include a hole injection layer (HIL), a hole transport layer (HTL), a light emitting layer (EML), an electron transport layer (ETL), and an electron injection layer (EIL), but the present disclosure is not limited thereto. The anode of the light emitting element OLED is connected to a fourth node n4 between the fourth and sixth switching elements M4 and M6. The fourth node n4 is connected to the anode of the light emitting element OLED, a second electrode of the fourth switching element M4, and a second electrode of the sixth switching element M6. The cathode of the light emitting element OLED is connected to a VSS electrode 106 to which the low potential power voltage VSS is applied. The light emitting element OLED emits light due to a current Ids flowing according to a gate-source voltage Vgs of the drive element DT. A current path of the light emitting element OLED is switched by the third and fourth switching elements M3 and M4.

The storage capacitor Cst is disposed between and connected to a VDD line 104 and a second node n2. The data voltage Vdata compensated for by as much as the threshold voltage Vth of the drive element DT is charged in the storage capacitor Cst. Since the data voltage Vdata in each sub-pixel is compensated for by as much as the threshold voltage Vth of the drive element DT, a characteristic deviation of the drive element DT in each sub-pixel is compensated for.

The first switching element M1 is turned on in response to the gate-on voltage VGL of the $N^{th}$ scan signal SCAN(N) to connect a second node n2 to a third node n3. The second node n2 is connected to a gate of the drive element DT, a first electrode of the storage capacitor Cst, and a first electrode of the first switching element M1. The third node n3 is connected to a second electrode of the drive element DT, a second electrode of the first switching element M1, and a first electrode of the fourth switch element M4. A gate of the first switching element M1 is connected to a first gate line 31 to receive the $N^{th}$ scan signal SCAN(N). The first electrode of the first switching element M1 is connected to the second node n2, and the second electrode thereof is connected to the third node n3.

The second switching element M2 is turned on in response to the gate-on voltage VGL of the $N^{th}$ scan signal SCAN(N) to supply the data voltage Vdata to the first node n1. A gate of the second switching element M2 is connected to the first gate line 31 to receive the $N^{th}$ scan signal SCAN(N). A first electrode of the second switching element M2 is connected to the first node n1. A second electrode of the second switching element M2 is connected to a data line 102 to which the data voltage Vdata is applied. The first node n1 is connected to the first electrode of the second switching element M2, a second electrode of the third switching element M3, and a first electrode of the drive element DT.

The third switching element M3 is turned on in response to a gate-on voltage VGL of the EM signal EM(N) to connect the VDD line 104 to the first node n1. A gate of the third switching element M3 is connected to a third gate line 33 to receive the EM signal EM(N). A first electrode of the third switching element M3 is connected to the VDD line 104. The second electrode of the third switching element M3 is connected to the first node n1.

The fourth switching element M4 is turned on in response to the gate-on voltage VGL of the EM signal EM(N) to connect the third node n3 to the anode of the light emitting element OLED. A gate of the fourth switching element M4 is connected to the third gate line 33 to receive the EM signal EM(N). The first electrode of the fourth switching element M4 is connected to the third node n3, and the second electrode thereof is connected to the fourth node n4.

The EM signal EM(N) controls the third and fourth switching elements M3 and M4 to be turned ON/OFF to switch the current path of the light emitting element OLED, thereby controlling a turning on/off time of the light emitting element OLED.

The fifth switching element M5 is turned on in response to a gate-on voltage VGL of the $(N-1)^{th}$ scan signal SCAN(N-1) to connect the second node n2 to a Vini line 105. A gate of the fifth switching element M5 is connected to a second-a gate line 32a to receive the $(N-1)^{th}$ scan signal SCAN(N-1). A first electrode of the fifth switching element M5 is connected to the second node n2, and a second electrode thereof is connected to the Vini line 105.

The sixth switching element M6 is turned on in response to the gate-on voltage VGL of the $(N-1)^{th}$ scan signal SCAN(N-1) to connect the Vini line 105 to the fourth node n4. A gate of the sixth switching element M6 is connected to a second-b gate line 32b to receive the $(N-1)^{th}$ scan signal SCAN(N-1). A first electrode of the sixth switching element M6 is connected to the Vini line 105, and a second electrode thereof is connected to the fourth node n4.

The drive element DT controls the current Ids flowing in the light emitting element OLED according to the gate-source voltage Vgs, thereby driving the light emitting element OLED. The drive element DT includes the gate connected to the second node n2, the first electrode connected to the first node n1, and the second electrode connected to the third node n3.

During the initialization time Tini, the $(N-1)^{th}$ scan signal SCAN(N-1) is generated as the gate-on voltage VGL. During the initialization time Tini, the $N^{th}$ scan signal SCAN(N) and the EM signal EM(N) are maintained as the gate-off voltage VGH. Thus, during the initialization time Tini, the fifth and sixth switching elements M5 and M6 are turned on so that the second and fourth nodes n2 and n4 are initialized at Vini. A hold time Th may be set between the initialization time Tini and the sampling time Tsam. During the hold time Th, the gate signals SCAN(N-1), SCAN(N), and EM(N) are maintained in previous states thereof.

During the sampling time Tsam, the $N^{th}$ scan signal SCAN(N) is generated as the gate-on voltage VGL. A pulse of the $N^{th}$ scan signal SCAN(N) is synchronized with a data voltage Vdata of an $N^{th}$ pixel line. During the sampling time Tsam, the $(N-1)^{th}$ scan signal SCAN(N-1) and the EM signal EM(N) are maintained as the gate-off voltage VGH. Therefore, during the sampling time Tsam, the first and second switching elements M1 and M2 are turned on.

During the sampling time Tsam, a gate voltage DTG of the drive element DT rises due to a current flowing through the first and second switching elements M1 and M2. Since the drive element DT is turned off, the gate node voltage DTG is Vdata−|Vth|. In this case, a voltage of the first node n1 is also Vdata−|Vth|. During the sampling time Tsam, the gate-source voltage Vgs of the drive element DT satisfies |Vgs|=Vdata−(Vdata−|Vth|)=|Vth|.

During the data write time Twr, the $N^{th}$ scan signal SCAN(N) is inverted to the gate-off voltage VGH. During the data write time Twr, the $(N-1)^{th}$ scan signal SCAN(N-1) and the EM signal EM(N) are maintained as the gate-off voltage VGH. Therefore, during the data write time Twr, all the switching elements M1 to M6 remain in an off state.

During the light emission time Tem, the EM signal EM(N) may be generated at the gate-off voltage VGH. During the light emission time Tem, in order to improve a low gradation expression, the EM signal EM(N) may be turned on or off at a predetermined duty ratio to swing between the gate-on voltage VGL and the gate-off voltage VGH. Accordingly, the EM signal EM(N) may be generated at the gate-on voltage VGL for at least a part of the light emission time Tem.

When the EM signal EM(N) is the gate-on voltage VGL, a current flows between an ELVDD and the light emitting element OLED so that the light emitting element OLED may emit light. During the light emission time Tem, the $(N-1)^{th}$ and $N^{th}$ scan signals SCAN(N-1) and SCAN(N) are maintained as the gate-off voltage VGH. During the light emission time Tem, the third and fourth switching elements M3 and M4 are repeatedly turned on and off according to a voltage of the EM signal EM(N). When the EM signal EM(N) is the gate-on voltage VGL, the third and fourth switching elements M3 and M4 are turned on so that a current flows in the light emitting element OLED. In this case, Vgs of the drive element DT satisfies |Vgs|=ELVDD−(Vdata−|Vth|), and the current flowing in the light emitting element OLED is K(ELVDD−Vdata)² K is a proportional constant determined by charge mobility, parasitic capacitance, and a channel capacity of the drive element DT.

Figure 18:
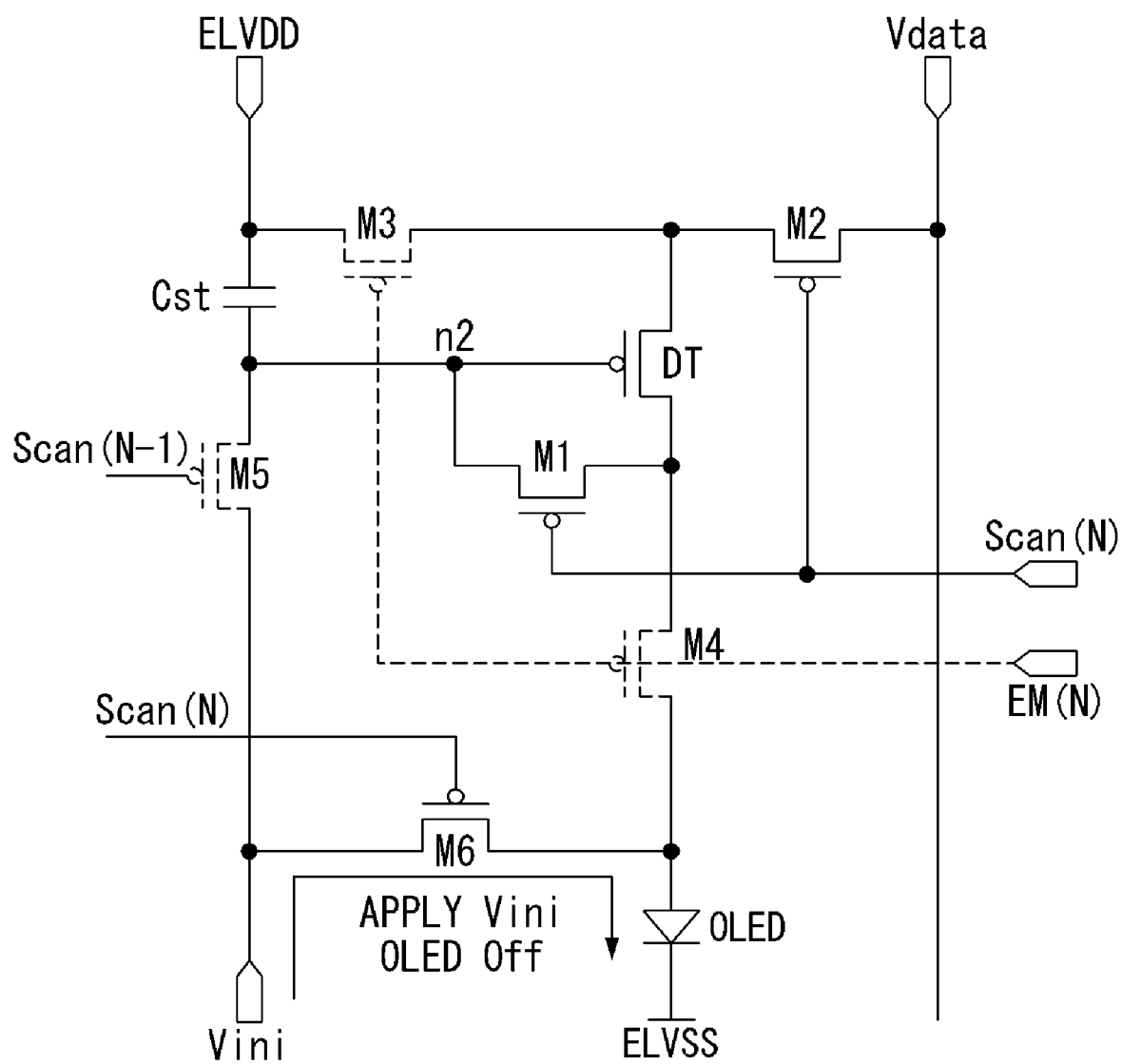
FIG. 18 is a circuit diagram illustrating an operation of a pixel in a non-activated screen.

The gates of the fifth and sixth switching elements M5 and M6 may be connected to the different gate lines 32a and 32b. As shown in FIGS. 7A and 18, a control signal of the sixth switch element M6 may be different in the activated screen from the non-activated screen. As shown in FIG. 7A, in the activated screen, the $(N-1)^{th}$ scan signal SCAN(N-1) is applied to the gate of the sixth switching element M6. As shown in FIG. 18, in the non-activated screen, the $N^{th}$ scan signal SCAN(N) is applied to the gate of the sixth switching element M6.

In the pixels of the activated screen, the $(N-1)^{th}$ scan signal SCAN(N-1) is applied to the gates of the fifth and sixth switching elements M5 and M6. On the other hand, as shown in FIG. 18, in the non-activated screen, the $(N-1)^{th}$ scan signal SCAN(N-1) is applied to the gate of the fifth switch element M5 and then the $N^{th}$ scan signal SCAN(N) is applied to the sixth switch element M6.

In the non-activated screen, in response to the N$^{th}$ scan signal SCAN(N), the sixth switching element M6 reduces an anode voltage of the light emitting element OLED to Vini, thereby suppressing light emission of the light emitting element OLED. Consequently, the pixels of the non-activated screen maintain brightness of a black gray scale due to not emitting light. According to the present disclosure, brightness of the non-activated screen may be controlled to the brightness of the black gray scale only by turning the sixth switch element M6 on during the sampling time Tsam and applying Vini to the anode of the light emitting element OLED. In this case, as shown in FIG. 18, in order to block an influence of other nodes connected to the anode of the light emitting element OLED, the third switching element M3 and the fourth switching element M4 may be turned off.

Figure 8:
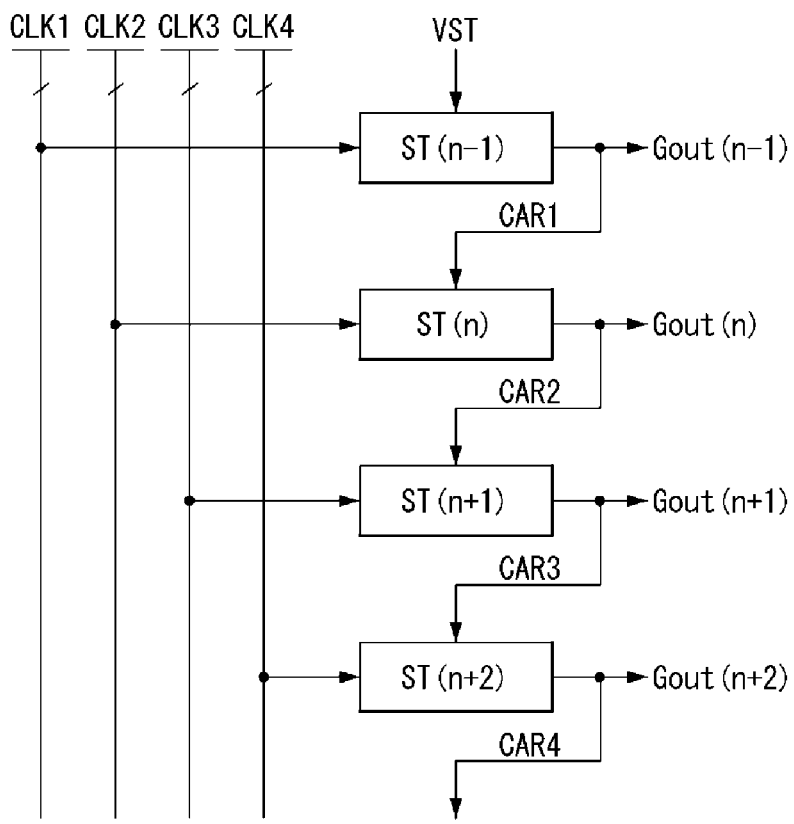
FIG. 8 is a schematic diagram illustrating a circuit configuration of a shift register in a gate driver.
Figure 9A:
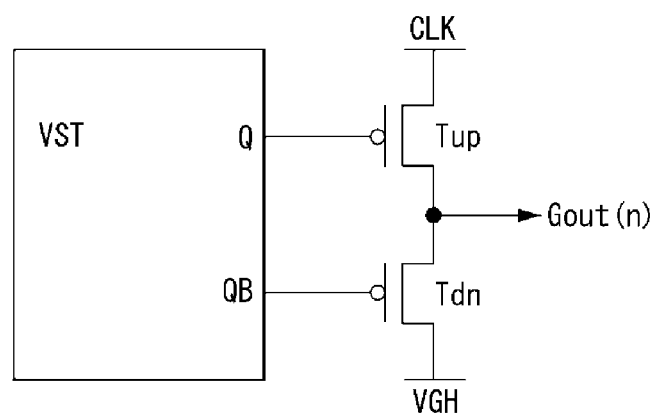
FIG. 9A is a schematic diagrams illustrating a pass gate circuit and an edge trigger circuit.
Figure 9B:
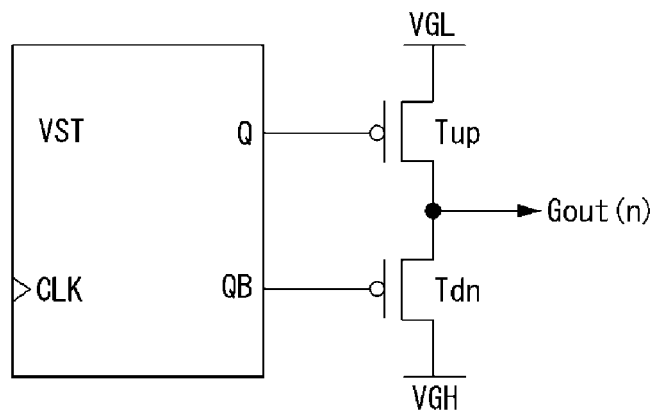
FIG. 9B is a schematic diagrams illustrating a pass gate circuit and an edge trigger circuit.

FIG. 8 is a schematic diagram illustrating a circuit configuration of a shift register in the gate driver 120. FIGS. 9A and 9B are schematic diagrams illustrating a pass-gate circuit and an edge trigger circuit.

Referring to FIG. 8, the shift register of the gate driver 120 includes stages ST(n–1) to ST(n+2) which are connected in cascade. The shift register receives the gate start pulse VST or carry signals CAR1 to CAR4 received from previous stages as the gate start pulse VST and generates output signals Gout(n–1) to Gout(n+2) in synchronization with rising edges of gate shift clocks CLK1 to CLK4. The output signals of the shift register include the gate signals SCAN(N–1), SCAN(N), and EM(N).

Each of the stages ST(n–1) to ST(n+2) of the shift register may be implemented as a pass-gate circuit as shown in FIG. 9A or an edge trigger circuit as shown in FIG. 9B.

Figure 10:
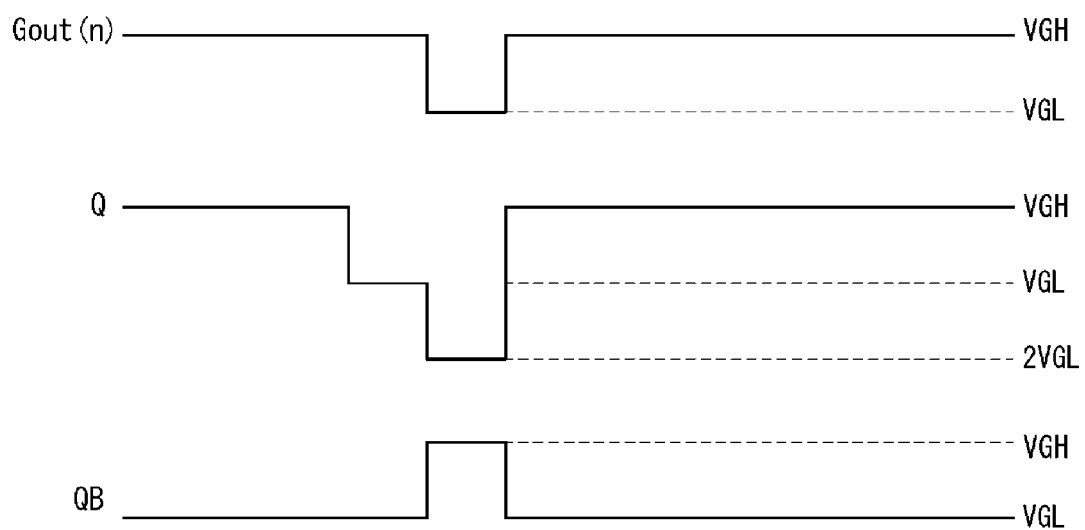
FIG. 10 is a waveform diagram showing a Q node voltage, a QB node voltage, and an output voltage of an nth stage shown in FIG. 8.

In the pass gate circuit, a clock CLK is input to a pull-up transistor Tup which is turned on or off according to a voltage of a node Q. Meanwhile, the gate-on voltage VGL is supplied to a pull-up transistor Tup of the edge trigger circuit, and the gate start pulse VST and the gate shift clocks CLK1 to CLK4 are input to the edge trigger circuit. A pull-down transistor Tdn is turned on or off according to a voltage of a node QB. In the pass-gate circuit, the node Q is floated according to a start signal in a pre-charged state. When the clock CLK is applied to the pull-up transistor Tup in a state in which the node Q is floated, the voltage of the node Q is changed to a voltage 2VGL that is higher than the gate-on voltage VGL shown in FIG. 10 due to bootstrapping so that a voltage of the output signal Gout(n) rises as a pulse of the gate-on voltage VGL.

Since the voltage of the output signal Gout(n) is changed to a voltage of the start signal in synchronization with the edge of the clock CLK, the edge trigger circuit generates the output signal Gout(n) in the same waveform as a phase of the start signal. When a waveform of the start signal is changed, the waveform of the output signal is changed accordingly. In the edge trigger circuit, an input signal may overlap the output signal.

FIG. 11 is a diagram illustrating a first shift register and a second shift register of the gate driver 120.

Referring to FIG. 11, the gate driver 120 may include a first shift register 120G and a second shift register 120E. The first shift register 120G may receive a gate start pulse GVST and a gate shift clock GCLK and sequentially output scan signals SCAN1 to SCAN 2160. The second shift register 120E may receive a gate start pulse EVST and a gate shift clocks ECLK and sequentially output EM signals EM1 to EM2160.

Figure 12:
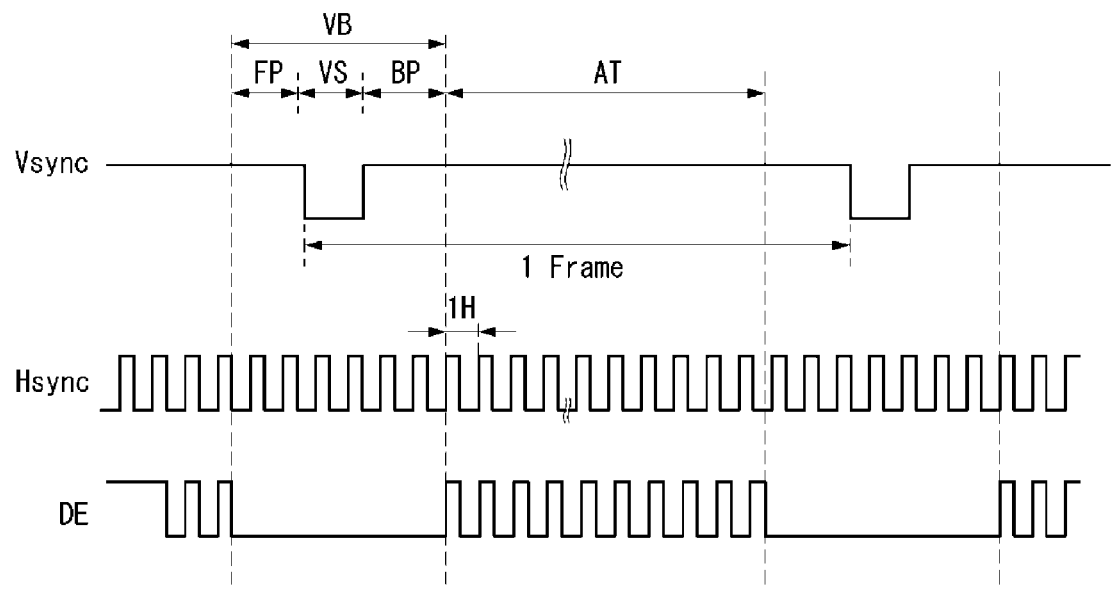
FIG. 12 is a detailed diagram illustrating an active interval and a vertical blank interval of one frame interval.

FIG. 12 is a detailed diagram illustrating an active interval and a vertical blank interval of one frame interval.

Referring to FIG. 12, one frame interval (one frame) is divided into an active interval AT for which pixel data is input, and a vertical blank interval VB for which pixel data is not present.

During the active interval AT, pixel data of one frame, which will be written in all the pixels P on the screens L, A, and R of the display panel 100, is received by the drive IC 300 and written in the pixels P.

The vertical blank interval VB is a blank interval for which pixel data is not received by a timing controller between an active interval AT of a (N–1)$^{th}$ frame interval (N is a natural number) and an active interval AT of an N$^{th}$ frame interval. The vertical blank interval VB includes a vertical sync time VS, a vertical front porch FP, and a vertical back porch BP.

The vertical blank interval VB is a time from a falling edge of a last pulse in a data enable signal DE received at the (N–1)$^{th}$ frame interval to a rising edge of a first pulse in the data enable signal DE received at the N$^{th}$ frame interval. A start time of the N$^{th}$ frame interval is a rising timing of the first pulse in the data enable signal DE.

A vertical synchronization signal Vsync defines one frame interval. A horizontal synchronization signal Hsync defines one horizontal time. The data enable signal DE defines a valid data interval including pixel data which will be displayed on the screen.

A pulse of the data enable signal DE is synchronized with the pixel data which will be written in the pixels of the display panel 100. One pulse period of the data enable signal DE is one horizontal time 1H.

Figure 13:
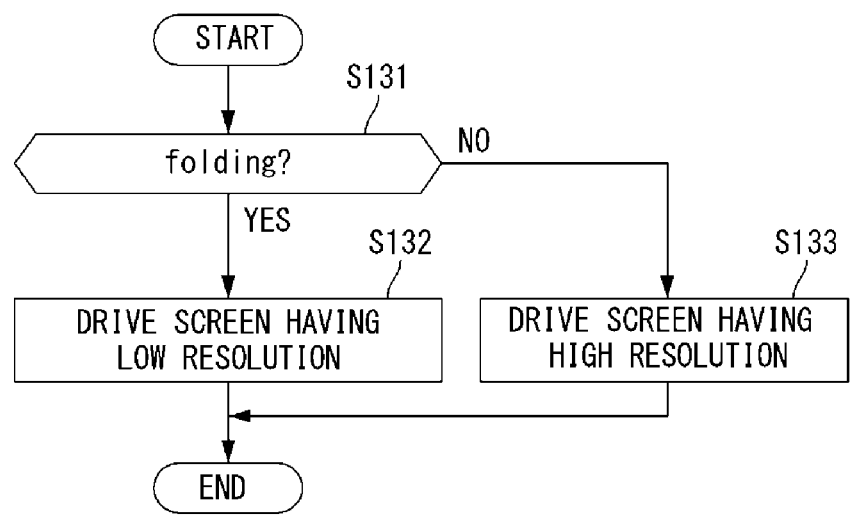
FIG. 13 is a diagram illustrating a screen driving method when a foldable display is folded and unfolded.
Figure 14:
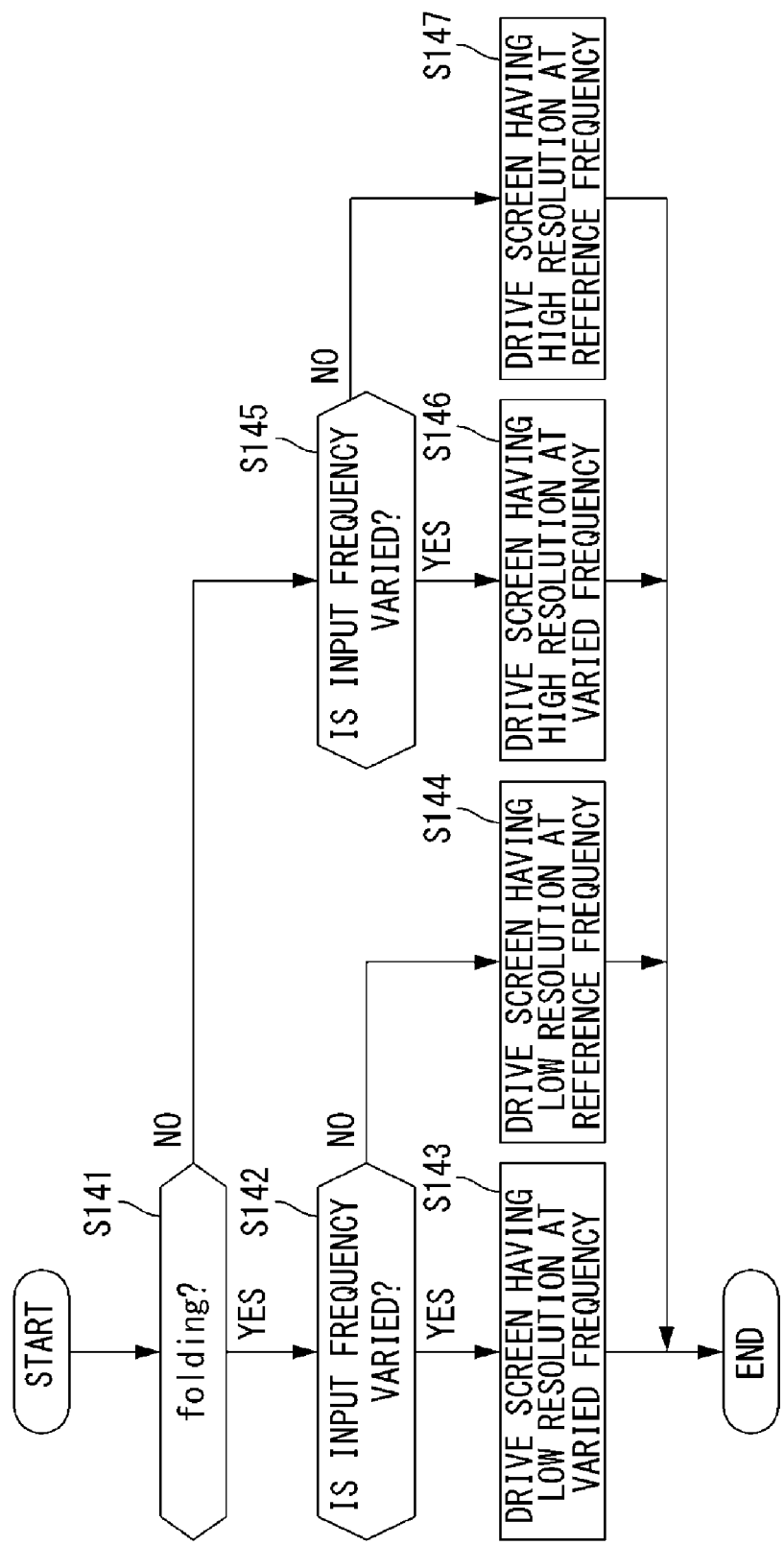
FIG. 14 is a diagram illustrating a screen driving method when a foldable display is folded and unfolded.
Figure 15:
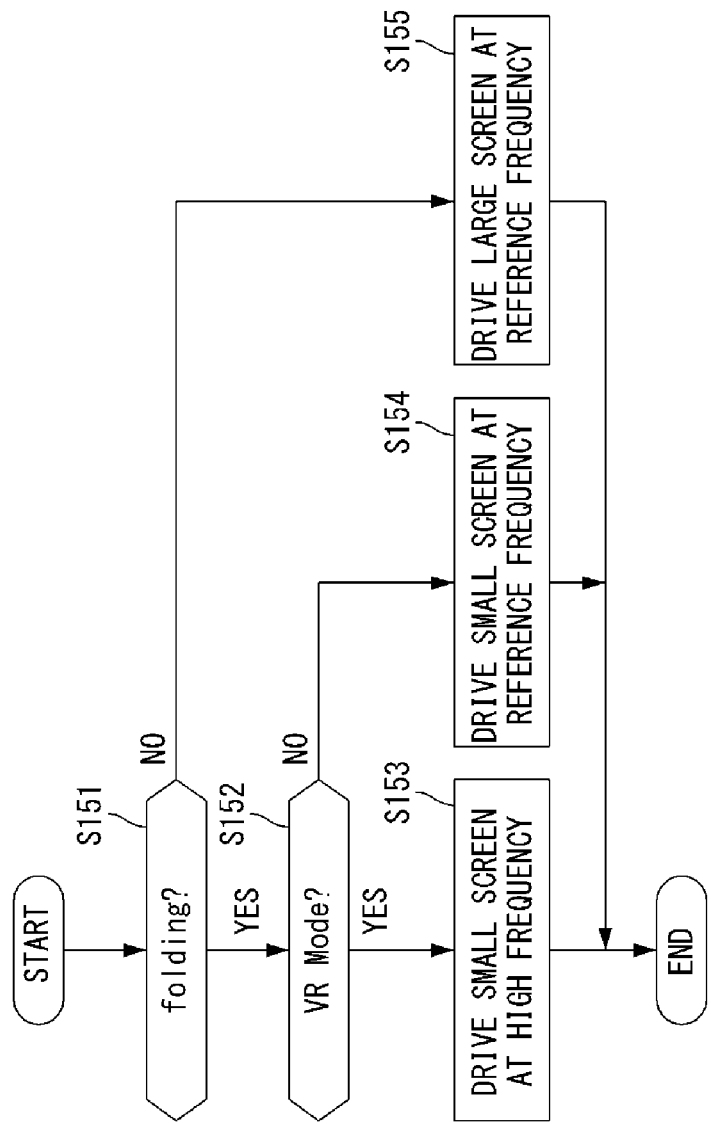
FIG. 15 is a diagram illustrating a screen driving method when a foldable display is folded and unfolded.

FIGS. 13 to 15 are diagrams illustrating a screen driving method when a foldable display is folded and unfolded.

Referring to FIG. 13, when the flexible display panel 100 is folded, the drive IC 300 drives a screen having a low resolution (S131 and S132). As shown in FIGS. 16A and 16B, the screen having the low resolution may be an activated screen having a 2160*1080 resolution. The screen having the low resolution may be an activated screen, at which the user looks, among the first screen L and the second screen R. The screen having a low resolution may be driven at a predetermined reference frequency or at a frequency different from the reference frequency. The reference frequency may be a frame frequency of 60 Hz. The frequency different from the reference frequency may be a frequency that is higher or lower than the reference frequency.

In an unfolded state in which the flexible display panel 100 is unfolded, the drive IC 300 drives a screen having a high resolution (S131 and S133). The screen having the high resolution may be an activated screen of a maximum screen combining the first screen L, the folding boundary A, and the second screen R. As shown in FIG. 17, the screen having a high resolution may be driven at the reference frequency or the frequency different from the reference frequency.

Referring to FIG. 14, when the flexible display panel 100 is folded, the drive IC 300 drives the screen having a low resolution (S141 to S144). In the folded state, a frame frequency of an image signal input to the drive IC 300 may be varied. In this case, the drive IC 300 detects the frame frequency of the input image signal and drives the screen having a low resolution at the varied frequency (S142 and S143). The varied frequency means the frame frequency different from the reference frequency. When the input frequency of the drive IC 300 is not varied in the folded state, the drive IC 300 drives the screen having a low resolution at the reference frequency (S142 and S144).

When the flexible display panel 100 is in the unfolded state in which the flexible display panel 100 is not folded, the drive IC 300 drives the screen having a high resolution (S145 and S147). In the unfolded state, a frame frequency of an image signal input to the drive IC 300 may be varied. In this case, the drive IC 300 detects the frame frequency of the input image signal and drives the screen having a high resolution at the varied frequency (S145 and S146). When the input frequency of the drive IC 300 is not varied in the unfolded state, the drive IC 300 drives the screen having a high resolution at the reference frequency (S145 and S147).

The foldable display of the present disclosure may drive any one screen in a virtual reality (VR) mode in the folded state. As shown in FIG. 15, in the VR mode, in order to prevent a user from feeling motion sickness and fatigue when he or she moves, it is necessary to move an image by reflecting movement of the user in real time at a high frame frequency.

Referring to FIG. 15, when the flexible display panel 100 is folded, the drive IC 300 drives the screen having low resolution (S151 to S154).

In the folded state, the user may select the VR mode in a state in which the foldable display is folded. In this case, the host system 200 transmits an image signal of a VR content selected by the user to the drive IC 300. In response to an output signal of the tilt sensor, the host system 200 may generate and transmit an image signal of a high frame frequency to the drive IC 300 by rendering pixel data to which movement of the user is reflected. In the VR mode, the drive IC 300 receives an input image signal having a frequency that is higher than the reference frequency and drives the screen having a low resolution at a high frequency. The high frequency may be a frame frequency of 120 Hz (S152 and S153). When the VR mode is not selected in the folded state, the drive IC 300 drives the screen having a low resolution at the reference frequency (S152 and S153).

When the flexible display panel 100 is in the unfolded state in which the flexible display panel 100 is not folded, the drive IC 300 drives the screen having a high resolution at the reference frequency (S151 to S155).

FIG. 18 is a circuit diagram illustrating an operation of a pixel formed in a non-activated screen. The non-activated screen is the second screen R in the example of FIG. 16A and is the first screen L in the example of FIG. 16B.

Referring to FIG. 18, pixels of the non-activated screen do not emit light and are maintained in a black display state. The non-activated screen may be a screen at which the user does not look when the flexible display panel 100 is folded.

In order to allow the non-activated screen to be maintained in a black display, a pixel circuit of the non-activated screen suppresses light emission of the light emitting element OLED. To this end, the sixth switching elements M6 of the non-activated screen are turned on in response to the gate-on voltage VGL of the $N^{th}$ scan signal SCAN(N) and apply Vini to the anodes of the light emitting elements OLED. When Vini is applied to the anode, since a voltage between the anode and the cathode is lower than the threshold voltage Vth, the light emitting element OLED is maintained in an OFF state to not emit light.

Figure 20:
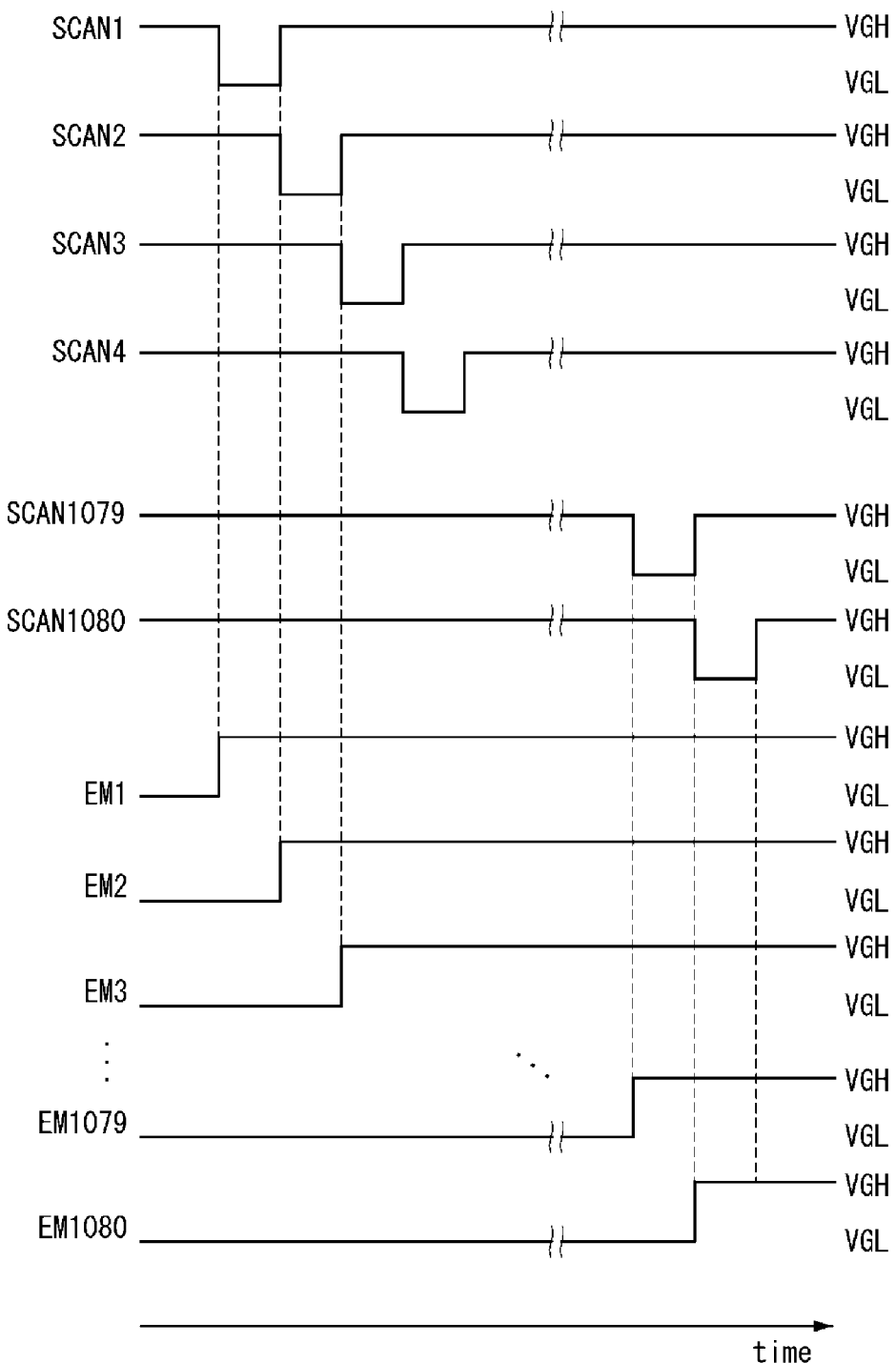
FIG. 20 is a diagram illustrating an example of the gate signal when the first screen is non-activated.

As shown in FIG. 20, the EM signal EM(N) applied to the pixels of the non-activated screen is applied as the gate-off voltage VGH during one frame interval or more. This is due to a residual charge of the drive element DT, which is accumulated due to a previous data signal, being prevented from influencing on an anode potential of the light emitting element OLED by blocking a current path between ELVDD and the drive element DT and a current path between the drive element DT and the light emitting element OLED. When the EM signal EM(N) of the gate-off voltage VGH is applied to the gates of the third and fourth switching elements M3 and M4, the third and fourth switching elements M3 and M4 are turned off.

The driver IC 300 supplies the data voltage Vdata only for a time for which the activated screen is scanned. Only for a scanning time of a screen activated in synchronization with the data voltage (Vdata) does the gate driver 120 sequentially supply output signals, that is, pulses of the scan signals SCAN(N−1) and SCAN(N) and the light emission control signals EM(N), to the gate lines of the activated screen. Only the activated screen is scanned in a progressive scan manner, and thus the data voltages Vdata are sequentially applied to the pixels one pixel line at a time.

For the remaining time in one frame interval except for the scanning time of the activated screen, an output buffer of the data driver 306 is turned off to not output the data voltage Vdata, and the data output channel of the data driver 306 becomes a high impedance state Hi-Z. When the data output channel is in the high impedance state Hi-Z, the data output channel is electrically separated from the data line so that power consumption does not occur in the data output channel.

In each pixel of the non-activated screen, the first, second, and sixth switching elements M1, M2, and M6 may be turned on according to the gate-on voltage VGL of the Nth scan signal SCAN(N). In each pixel of the non-activated screen, the third, fourth, and fifth switching elements M3, M4, and M5 may be turned off according to the gate-off voltage VGH of the $(N-1)^{th}$ scan signal SCAN(N−1). Whenever the scan signal SCAN(N) is applied, since the anode voltages of the light emitting elements OLED formed on the non-activated screen are initialized to Vini, the light emitting elements OLED are turned off to not emit light. Therefore, the pixels of the non-activated screen maintain the brightness of the black gray scale at Vini applied to the anodes of the light emitting elements OLED without receiving the data voltage.

Figure 19:
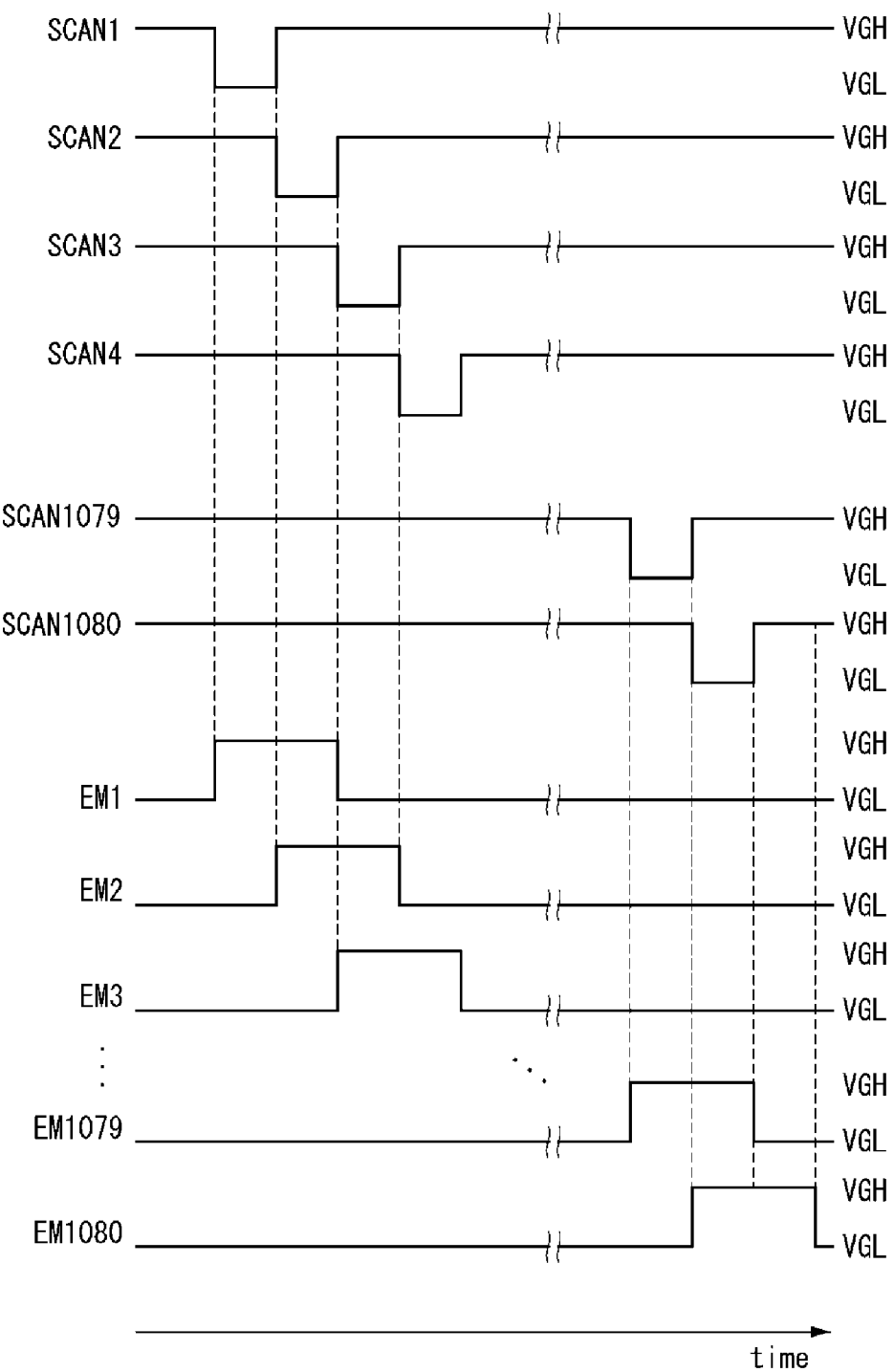
FIG. 19 is a diagram illustrating an example of a gate signal when a first screen is activated.

FIG. 19 is a diagram illustrating an example of a gate signal when a first screen is activated.

Referring to FIG. 19, the first screen L is activated so that an image may be displayed on the first screen L. The data output channels of the drive IC 300 output the data voltage Vdata of the input image at a scanning time of the activated first screen L. The scan signals SCAN1 to SCAN1080 may be pulses of the gate-on voltage VGL synchronized with the data voltage Vdata and may be sequentially supplied to the pixel lines of the first screen L. The EM signals EM1 to EM1080 may be generated as pulses of the gate-off voltage VGH synchronized with the $(N-1)^{th}$ and $N^{th}$ scan signals SCAN(N−1) and SCAN(N). The EM signals EM1 to EM1080 may be inverted into the gate-on voltage VGL during at least a portion of the light emission time Tem to form the current path between ELVDD and the light emitting element OLED.

FIG. 20 is a diagram illustrating an example of the gate signal when the first screen is non-activated.

Referring to FIG. 20, when the first screen L is non-activated, the first screen L displays black. In this case, the data output channels of the drive IC 300 become a high impedance state at the scanning time of the first screen L and do not output the data voltage Vdata. The scan signals SCAN to SCAN1080 are sequentially supplied to the pixel lines of the first screen L. The sixth switching elements M6 of the first screen L are turned on in response to the scan signals SCAN1 to SCAN1080 to apply Vini to the anodes of the light emitting elements OLED. The EM signals EM1 to EM1080 may be generated as pulses of the gate-off voltage VGH during one frame interval or more. Consequently, since Vini is applied to the anodes of the light emitting elements OLED in all pixels, the non-activated first screen L displays a black gray scale.

Figure 28:
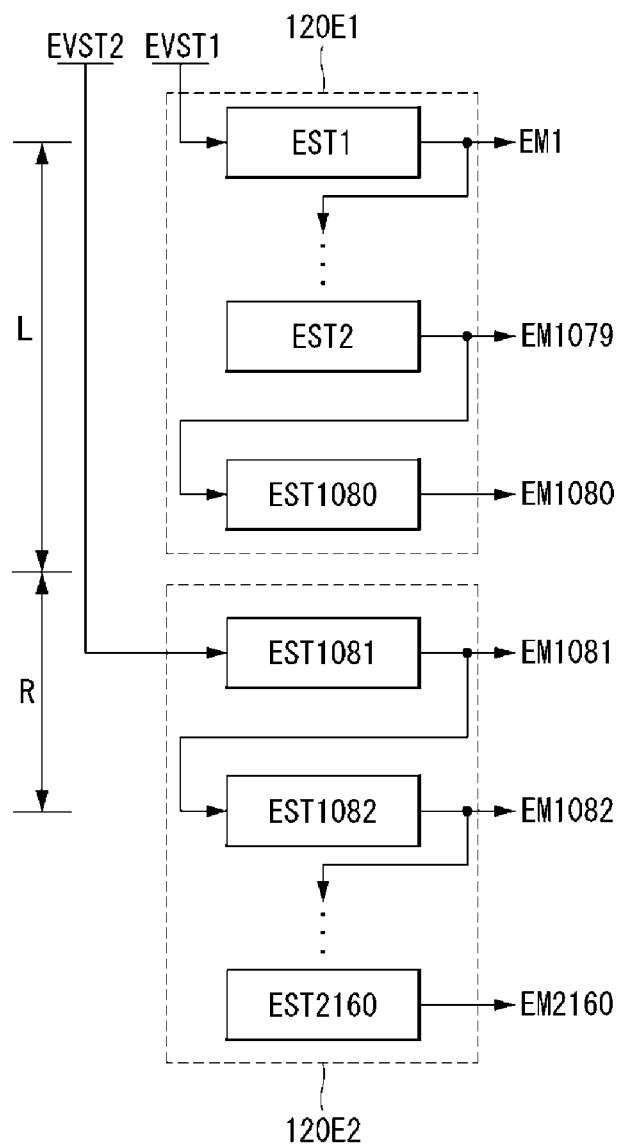
FIG. 28 is a diagram illustrating a first gate driver and a second gate driver according to an aspect of the present disclosure.

As in examples of FIGS. 28 and 29, the gate driver may include a first gate driver and a second gate driver. Each of the first gate driver and the second gate driver may sequentially outputs an output signal (scan signal and EM signal) using a shift register to which a gate start pulse and a gate shift clock are input.

Figure 21:
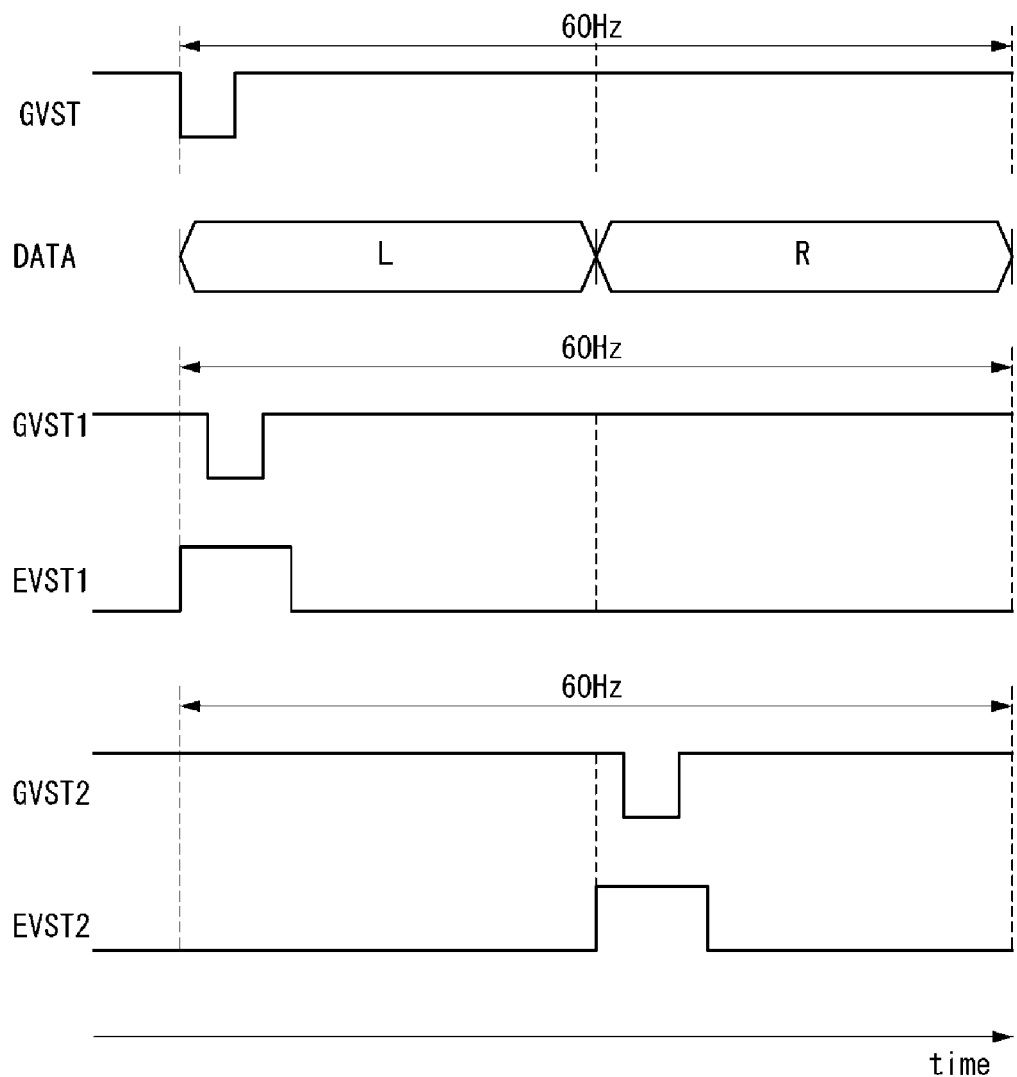
FIG. 21 is a waveform diagram illustrating a gate start pulse when all screens are activated.

The first gate driver is connected to the gate lines of the first screen L, starts to output a gate signal when a first gate start pulse is input, and shifts the gate signal at each gate shift clock to sequentially apply the gate signal to the gate lines of the first screen L. As shown in FIG. 21, the first gate start pulse may include a first-first start pulse GVST1 for generating a scan signal and a second-first start pulse EVST1 for generating an EM signal.

The second gate driver is connected to the gate lines of the second screen R, starts to output a gate signal when a second gate start pulse is input, and shifts the gate signal at each gate shift clock to sequentially apply the gate signal to the gate lines of the second screen R. As shown in FIG. 21, the second gate start pulse may include a first-second start pulse GVST2 for generating a scan signal and a second-second start pulse EVST2 for generating an EM signal.

Figure 24:
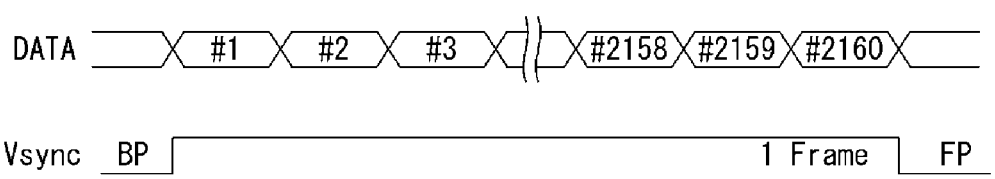
FIG. 24 is a waveform diagram illustrating a data signal and a vertical synchronization signal when the entire screen is activated.

FIG. 21 is a waveform diagram illustrating a gate start pulse when all the screens L, A, and R are activated. In a state in which the flexible display panel 100 is unfolded, an input image may be displayed on all the screens L, A, and R. FIG. 24 is a waveform diagram illustrating a data signal and a vertical synchronization signal when the entire screen is activated. In FIG. 24, #1, #2, . . . , and #2160 are pixel line numbers indicating data signals for the pixel lines.

Referring to FIGS. 21 and 24, the first-first start pulse GVST1 is generated as a pulse of the gate-on voltage VGL at the beginning of one frame interval. The second-first start pulse EVST1 is generated as a pulse of the gate-off voltage VGH at the beginning of one frame interval.

The first-second start pulse GVST2 is generated as a pulse of the gate-on voltage VGL at about half time of the one frame interval. The second-second start pulse EVST2 is generated as a pulse of the gate-off voltage VGH at about half time of one frame interval.

While all the screens L, A, and R are activated, each of the first gate start pulses GVST1 and EVST1 and each of the second gate start pulses GVST2 and EVST2 may be generated at a frequency of 60 Hz.

FIGS. 22, 23, 25, and 26 are diagrams illustrating a method of driving only half of all the screens as an activated screen.

Figure 22:
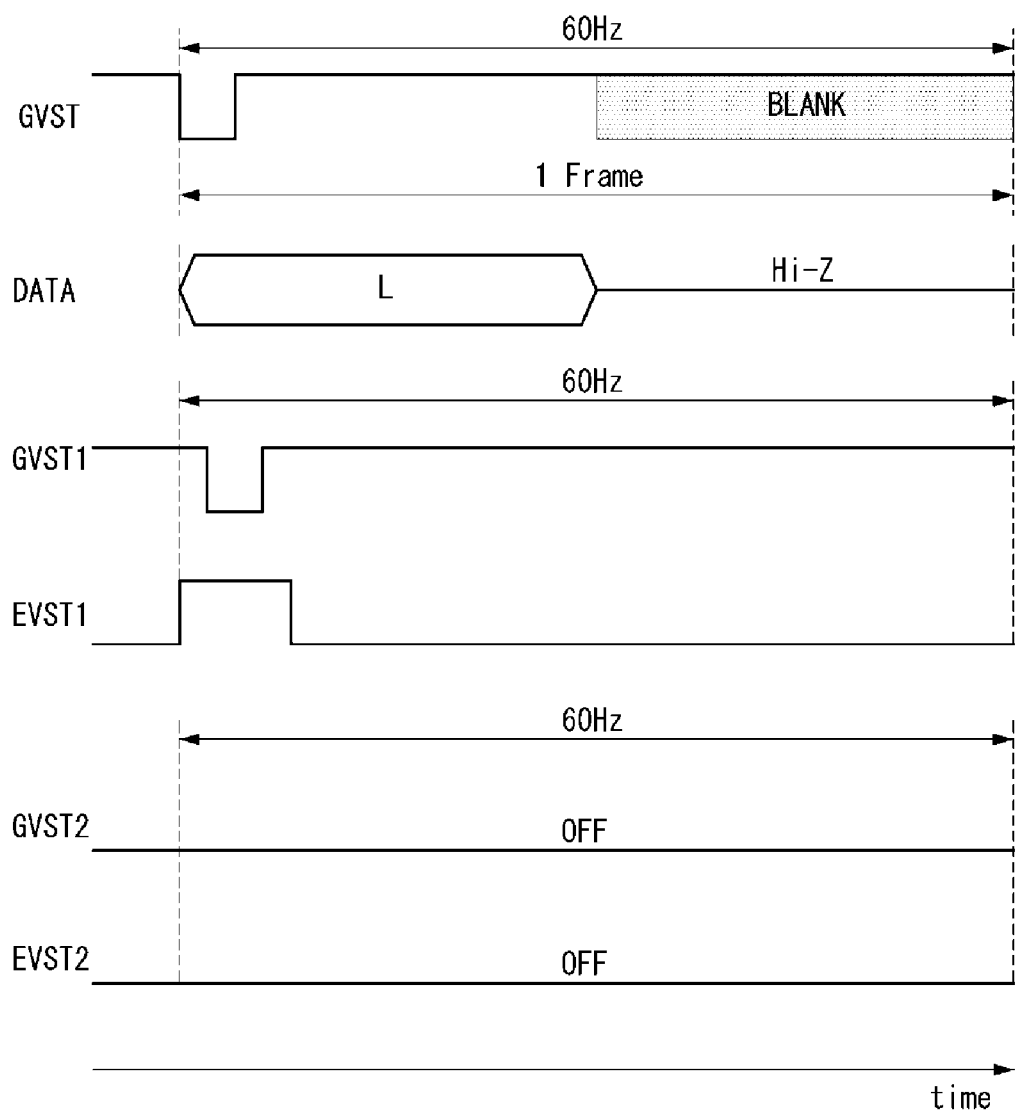
FIG. 22 is a waveform diagram illustrating a gate start pulse when the first screen is driven at a frame frequency of 60 Hz.
Figure 25:
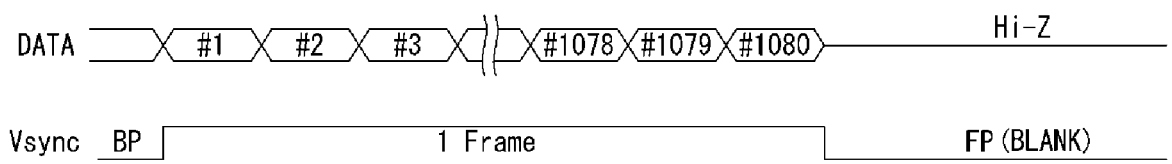
FIG. 25 is a waveform diagram illustrating a data signal and a vertical synchronization signal when the first screen is driven at the frame frequency of 60 Hz.

FIG. 22 is a waveform diagram illustrating a gate start pulse when the first screen L is driven at a frame frequency of 60 Hz. FIG. 25 is a waveform diagram illustrating a data signal and a vertical synchronization signal when the first screen L is driven at the frame frequency of 60 Hz.

In examples of FIGS. 22 and 25, the first screen L is activated and driven at the frequency of 60 Hz to display pixel data of an input image. The second screen R is non-activated to display black.

Referring to FIGS. 22 and 25, when only the first screen L is activated, the first gate start pulses GVST1 and EVST1 may be generated at a frequency of 60 Hz. In this case, the second gate start pulses GVST2 and EVST2 are not generated.

The first screen L displays the input image, whereas the second screen R displays black with minimum brightness. The folding boundary A may be an activated screen or a non-activated screen.

During one or two frame intervals (8.3 ms) at the frame frequency of 60 Hz, the drive IC 300 outputs a data voltage Vdata supplied to the pixels of the first screen L through the data output channels. Subsequently, during the one or two frame intervals, the drive IC 300 turns output buffers of the data output channels off to maintain the data output channels at the high impedance Hi-Z.

After the first screen L is scanned, since the data voltage Vdata of the pixel data is not output from the drive IC 300, the pixel data of the input image is not written to the pixels of the second screen R. The gate driver 120 sequentially supplies the scan pulses SCAN(N) to the gate lines of the second screen R to which the data voltage Vdata is not applied and thus, as shown in FIG. 18, applies Vini to the anode of the light emitting element OLED, thereby suppressing light emission of the pixels. Consequently, the second screen R displays a black gray scale.

In one frame interval (16.67 ms) at the frame frequency of 60 Hz, a second half time is a vertical blank time BLANK in which the data voltage Vdata is not supplied to the pixels so that the vertical blank time (VB=BLANK) is extended by as much as the second half time. Accordingly, this driving method may obtain an impulsive or black data inversion (BDI) effect.

Figure 23:
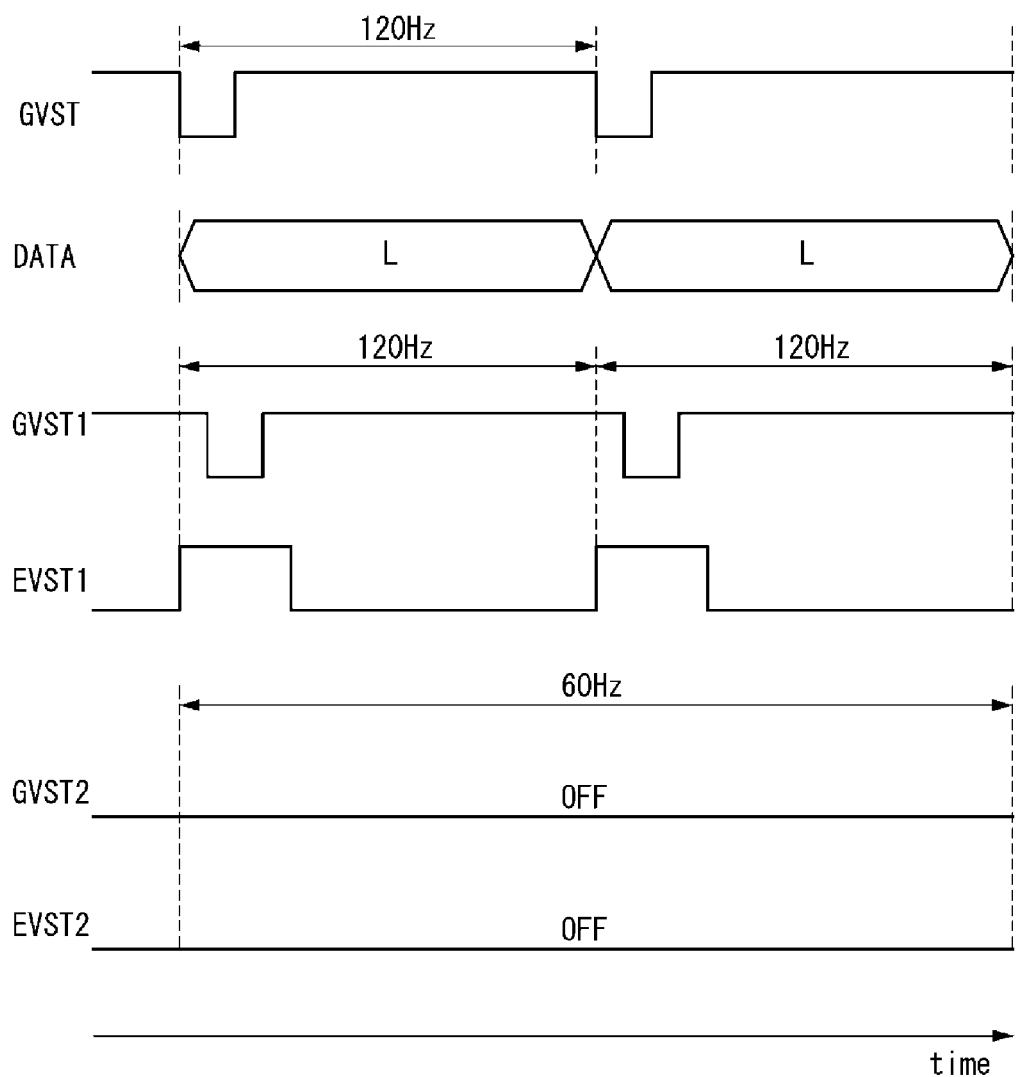
FIG. 23 is a waveform diagram illustrating a gate start pulse when the first screen is driven at a frame frequency of 120 Hz.
Figure 26:
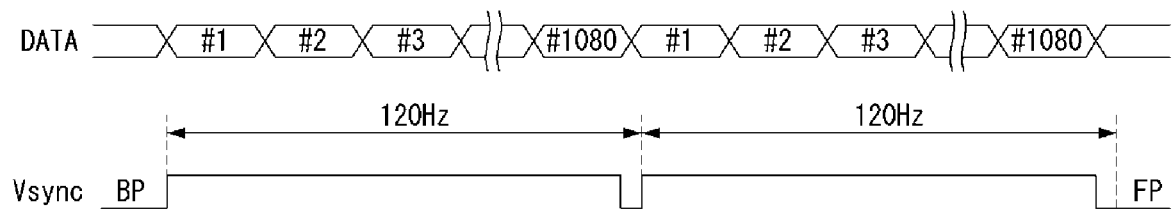
FIG. 26 is a waveform diagram illustrating a data signal and a vertical synchronization signal when the first screen is driven at the frame frequency of 120 Hz.

FIG. 23 is a waveform diagram illustrating a gate start pulse when the first screen L is driven at a frame frequency of 120 Hz. FIG. 26 is a waveform diagram illustrating a data signal and a vertical synchronization signal when the first screen L is driven at the frame frequency of 120 Hz.

Referring to FIGS. 23 and 26, when only the first screen L is activated, the first gate start pulses GVST1 and EVST1 may be generated at a frequency of 120 Hz. In this case, the second gate start pulses GVST2 and EVST2 are not generated.

The first screen L displays the input image, whereas the second screen R displays black with minimum brightness. The folding boundary A may be an activated screen or a non-activated screen.

The drive IC 300 is driven at the frame frequency of 120 Hz, and, during the one or two frame intervals (8.3 ms), the drive IC 300 outputs a data voltage Vdata supplied to the pixels of the first screen L through the data output channels.

Figure 27:
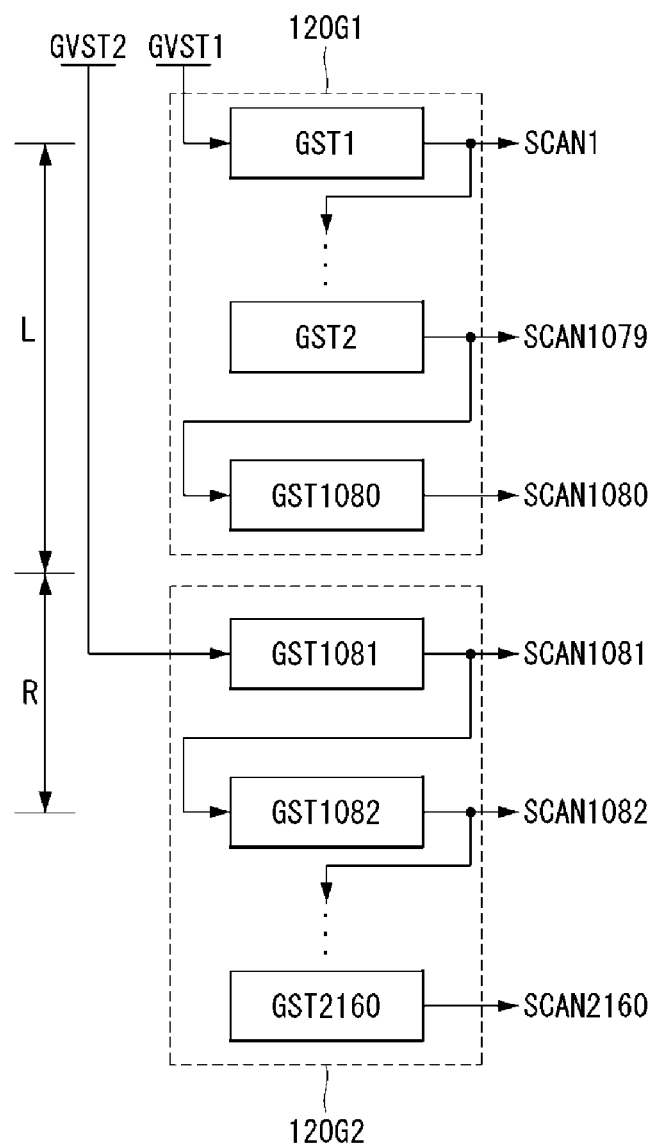
FIG. 27 is a diagram illustrating a first gate driver and a second gate driver according to an aspect of the present disclosure.

FIGS. 27 and 28 are diagrams illustrating a first gate driver and a second gate driver according to an aspect of the present disclosure.

Referring to FIGS. 27 and 28, the gate driver may include a first gate driver for driving gate lines of the first screen L and a second gate driver for driving gate lines of the second screen R.

The gate lines of the folding boundary A may be separately driven by first gate drivers 120G1 and 120E1 and second gate drivers 120G2 and 120E2. For example, gate lines formed in a half area of the folding boundary A close to the first screen L may be driven by the first gate drivers 120G1 and 120E1. Gate lines formed in the remaining half area of the folding boundary A close to the second screen R may be driven by the second gate drivers 120G2 and 120E2.

The first gate drivers 120G1 and 120E1 include a first-first shift register 120G1 for sequentially supplying the scan signals SCAN(N−1) and SCAN(N) to the gate lines 31, 32a, 32b of the first screen L, and a second-first shift register 120E1 for sequentially supplying the EM signal EM(N) to the gate lines 33 of the first screen L.

The first-first shift register 120G1 includes a plurality of stages GST1 to GST1080 which are connected in cascade to sequentially generate outputs. The first-first shift register 120G1 receives the first-first start pulse GVST1 and the gate shift clock and sequentially outputs and supplies the first to 1080$^{th}$ scan signals SCAN to SCAN1080 to the gate lines 31, 32*a*, and 32*b* of the first screen L. The second-first shift register 120E1 includes a plurality of stages EST1 to EST1080 which are connected in cascade to sequentially generate outputs. The second-first shift register 120E1 receives the second-first start pulse EVST1 and the gate shift clock and sequentially outputs and supplies the first to 1080$^{th}$ scan signals EM1 to EM1080 to the gate lines 33 of the first screen L.

The second gate drivers 120G2 and 120E2 include a first-second shift register 120G2 for sequentially supplying the scan signals SCAN(N−1) and SCAN(N) to the gate lines 31, 32*a*, 32*b* of the second screen L, and a second-second shift register 120E2 for sequentially supplying the EM signal EM(N) to the gate lines 33 of the second screen R.

The first-second shift register 120G2 includes a plurality of stages GST1081 to GST2160 which are connected in cascade to sequentially generate outputs. The first-second shift register 120G2 receives the first-second start pulse GVST1 and the gate shift clock and sequentially outputs and supplies the 1081$^{th}$ to 2160$^{th}$ scan signals SCAN1081 to SCAN2160 to the gate lines 31, 32*a*, and 32*b* of the second screen R. The second-second shift register 120E2 includes a plurality of stages EST1081 to EST2160 which are connected in cascade to sequentially generate outputs. The second-second shift register 120E2 receives the second-second start pulse EVST2 and the gate shift clock and sequentially outputs and supplies the 1081$^{th}$ to 2160$^{th}$ scan signals EM1081 to EM2160 to the gate lines 33 of the second screen R.

Figure 29A:
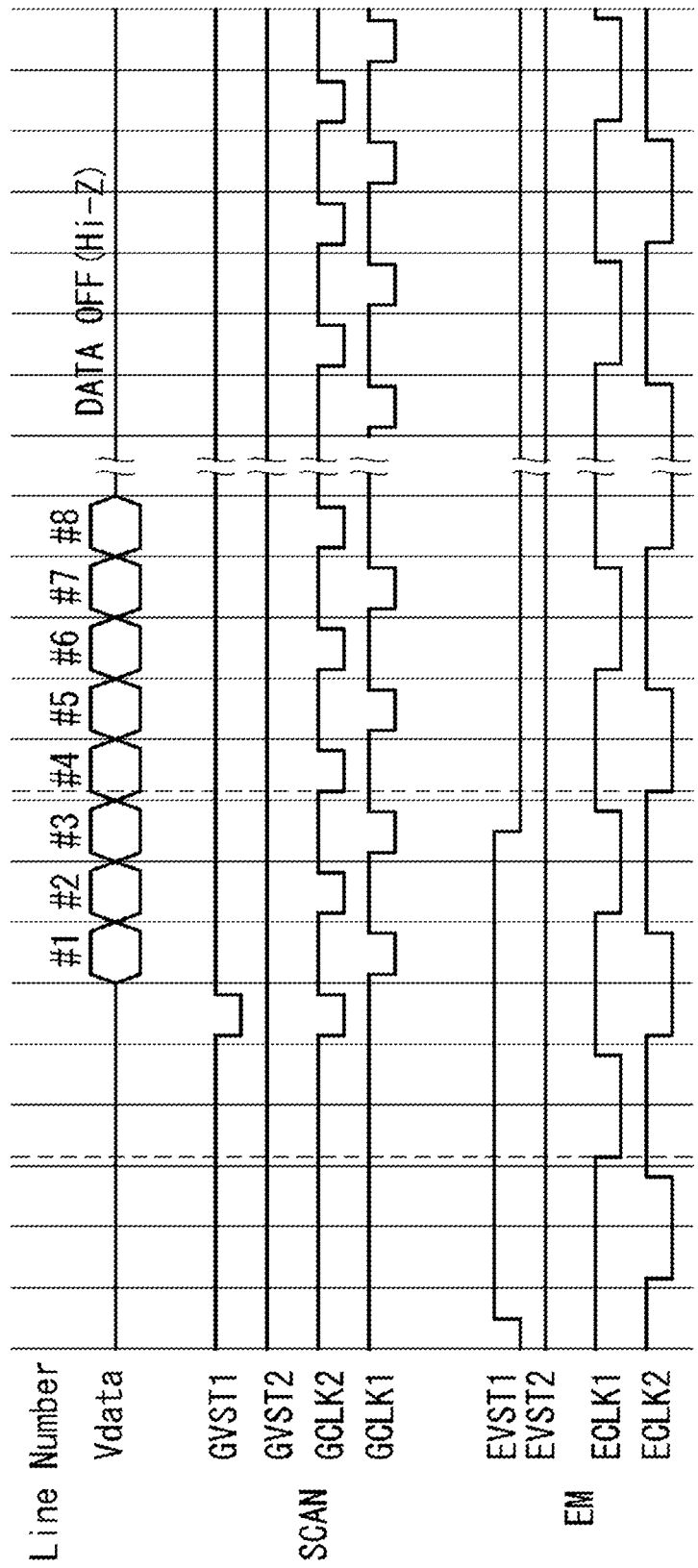
FIG. 29A is a waveform diagrams illustrating a data signal and a gate start pulse when only some of the screens are activated.
Figure 29B:
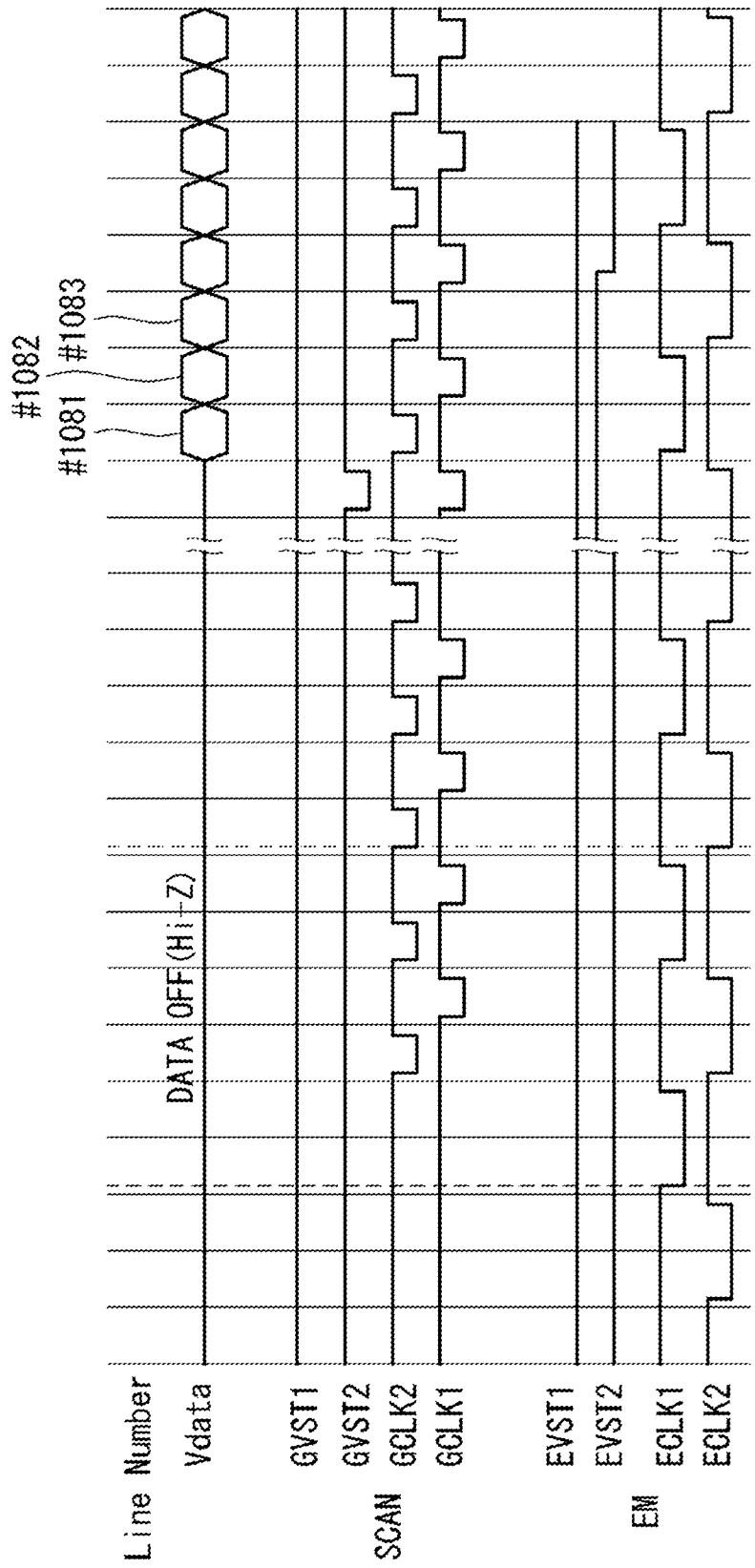
FIG. 29B is a waveform diagrams illustrating a data signal and a gate start pulse when only some of the screens are activated.

FIGS. 29A and 29B are waveform diagrams illustrating a data signal and a gate start pulse when only some of the screens are activated. In FIGS. 29A and 29B, GCLK1 and GCLK2 represent the gate shift clocks input to the first-first shift register 120G1 and the first-second shift register 120G2. ECLK1 and ECLK2 represent the gate shift clocks input to the second-first shift register 120E1 and the second-second shift register 120E2.

Figure 30:
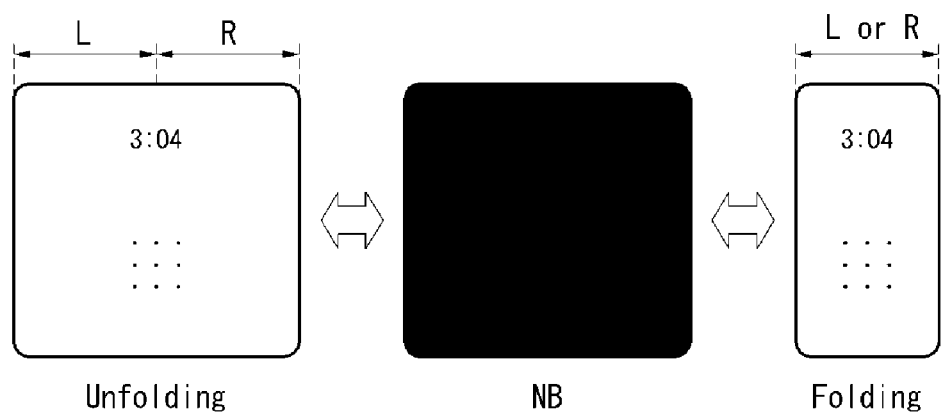
FIG. 30 is a diagram illustrating an example in which an entirety of a screen displays black during a state switching time between a folded state and an unfolded state of a flexible display panel.

FIG. 30 is a diagram illustrating an example in which an entirety of a screen displays black during a state switching time between a folded state and an unfolded state of the flexible display panel 100.

Referring to FIG. 30, when the flexible display panel 100 is being folded from the unfolded state to the folded state or vice versa, during a state switching time, all the screens L, A, and R are switched as non-activated screens, and then a part of all the screens L, A, and R is driven as an activated screen. When all the screens L, A, and R are non-activated, all the screens L, A, and R show a black pattern NB. While the flexible display panel 100 is folded or unfolded, since all the screens L, A, and R show the black pattern NB and then an image is displayed on the part of all the screens, the user recognizes a flickering phenomenon of all the screens.

Figure 31:
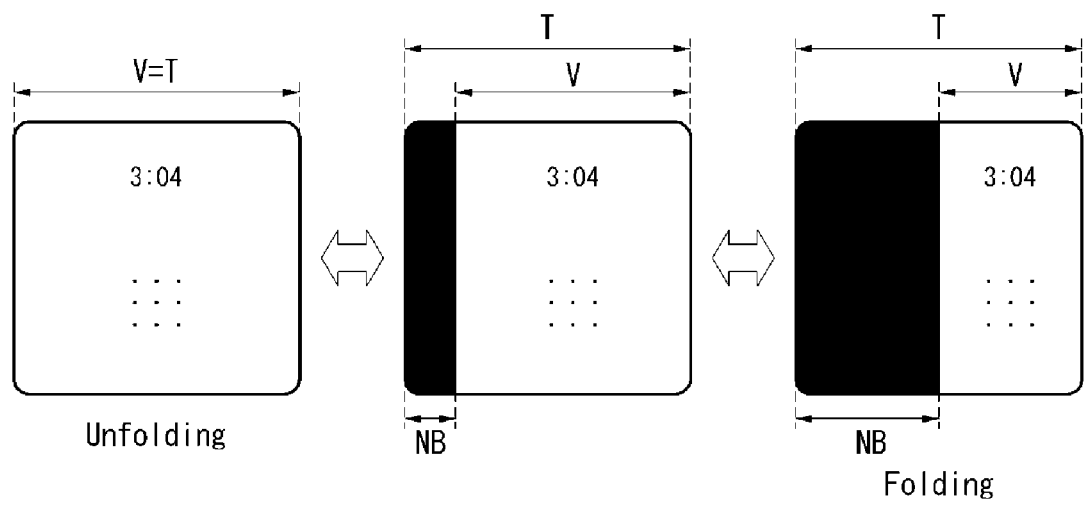
FIG. 31 is a diagram illustrating an example in which sizes of an activated screen and a non-activated screen are gradually varied when the folded state and the unfolded state are being switched in a foldable display according to an aspect of the present disclosure.
Figure 32:
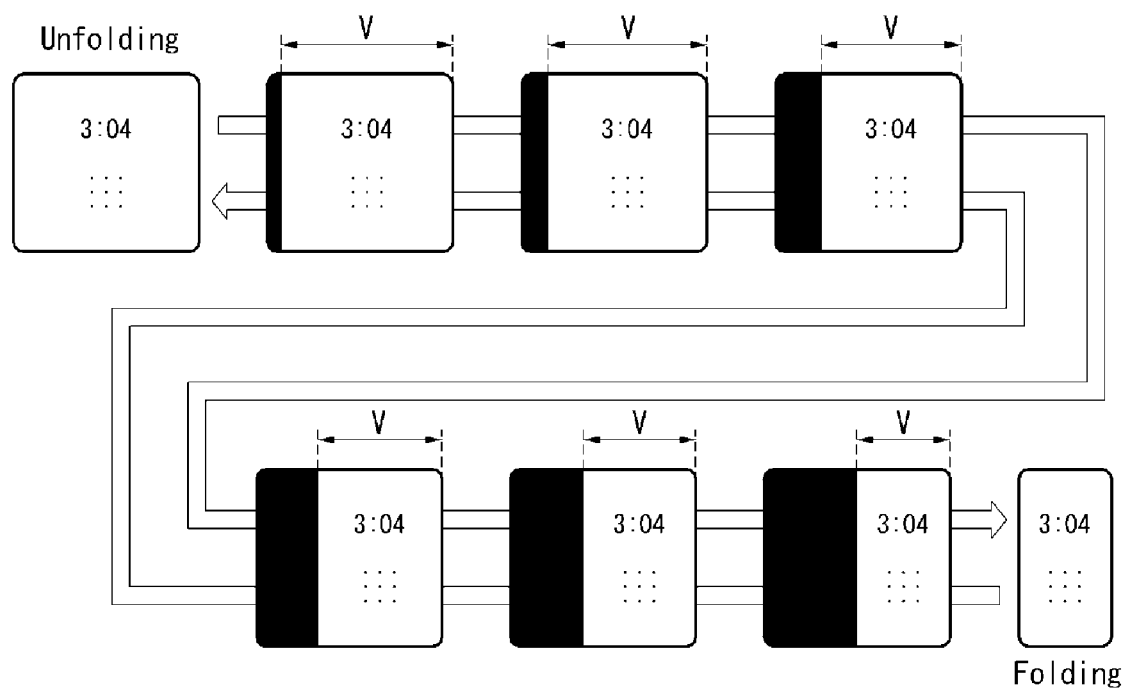
FIG. 32 is a diagram illustrating an example in which sizes of an activated screen and a non-activated screen are gradually varied when the folded state and the unfolded state are being switched in a foldable display according to an aspect of the present disclosure.
Figure 33:
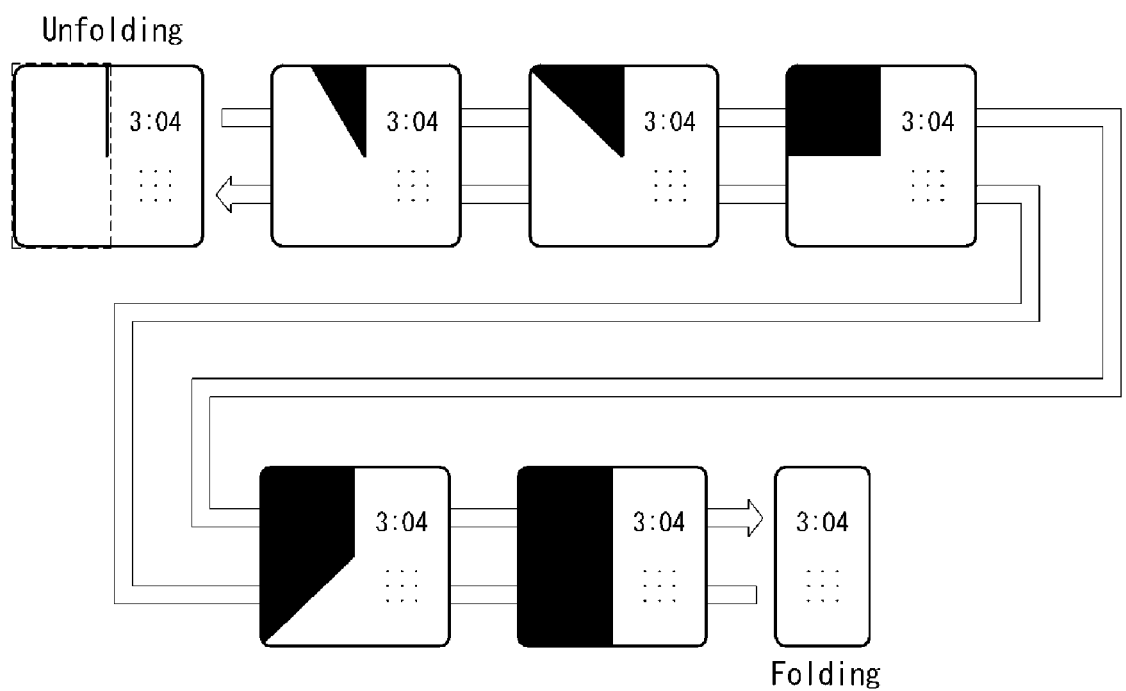
FIG. 33 is a diagram illustrating an example in which sizes of an activated screen and a non-activated screen are gradually varied when the folded state and the unfolded state are being switched in a foldable display according to an aspect of the present disclosure.

According to the present disclosure, as shown in FIGS. 31 to 33, during the state switching time between the folded state and the unfolded state of the flexible display panel 100, the sizes of the activated screen and the non-activated screen are gradually varied. When the flexible display panel 100 is folded or unfolded, the user does not recognize the flickering of the screen. Therefore, according to the present disclosure, when the state is being switched between the folded state and the unfolded state of the flexible display panel 100, screen adaptability of the user can be improved.

FIGS. 31 to 33 are diagrams illustrating an example in which sizes of an activated screen and a non-activated screen are gradually varied when the folded state and the unfolded state are being switched in a foldable display according to an aspect of the present disclosure.

Figure 34:
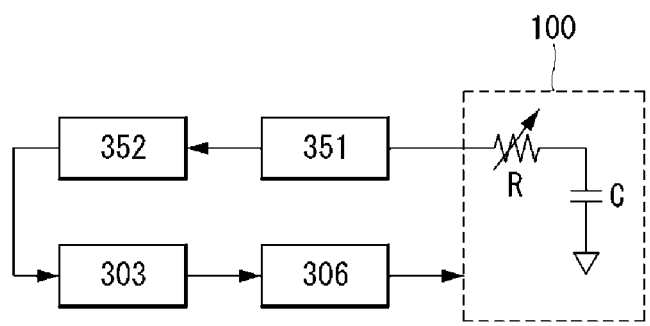
FIG. 34 is a diagram illustrating a resolution converter according to an aspect of the present disclosure.
Figure 37:
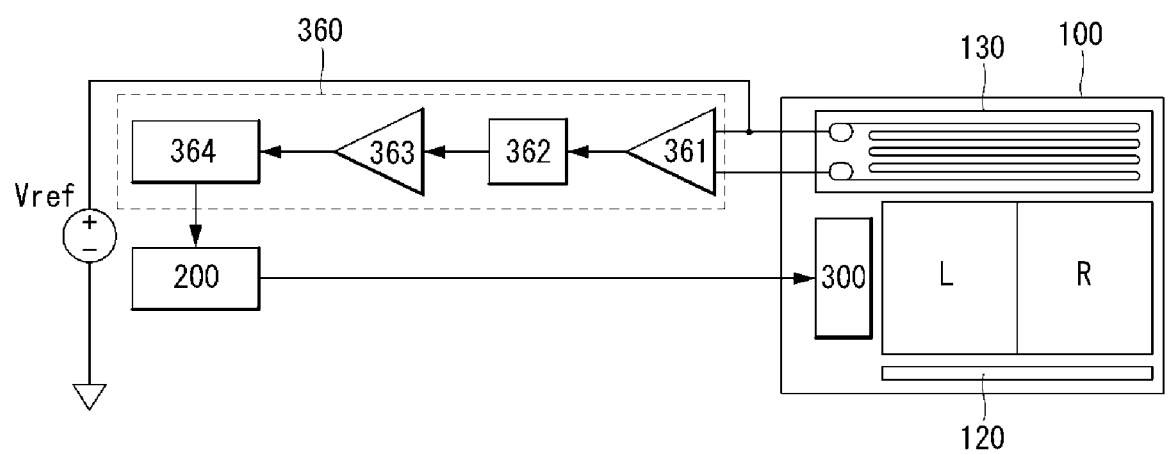
FIG. 37 is a diagram illustrating a resistance measuring device according to an aspect of the present disclosure.

When the flexible display panel 100 is being switched from the unfolded state to the folded state or vice versa, an image processor of the present disclosure gradually varies a resolution of the activated screen. In FIGS. 34 and 37, a reference numeral "362" may be the image processor.

Referring to FIGS. 31 to 33, when the flexible display panel 100 is being switched from the unfolded state to the folded state, the size of the activated screen is gradually reduced. In this case, the image processor gradually reduces the resolution of the activated screen.

As shown in FIG. 32, while the folding angle of the flexible display panel 100 is varied, the image processor may reduce a resolution of the image displayed on the activated screen while shifting pixel data of the image displayed on the activated screen in one direction. The image processor may gradually enlarge the non-activated screen, that is, the size of the black pattern NB, by as much as reduction in the size of the activated screen.

When the flexible display panel 100 is being switched from the folded state to the unfolded state, the image processor gradually enlarges the size of the activated screen. In this case, the image processor gradually controls to increase the resolution of the activated screen. Meanwhile, when the flexible display panel 100 is being switched from the folded state to the unfolded state, the image processor gradually reduces the size of the black pattern NB.

As shown in FIG. 32, the image processor may increase the resolution of the image displayed on the activated screen while shifting the pixel data of the image displayed on the activated screen in one direction. The image processor may gradually reduce the size of the black pattern NB by as much as an increase in the size of the activated screen.

As shown in FIG. 33, while the folding angle of the flexible display panel 100 is varied, the image processor may gradually vary a size of a fan-shaped area in which the black pattern NB is displayed. While the folding angle of the flexible display panel 100 is varied, the image processor may gradually vary a size of an activated area in which the image is displayed.

The fan-shaped area indicated by the black pattern NB has a center angle at a center of all the screens L, A, and R. When the flexible display panel 100 is being switched from the unfolded state to the folded state, the center angle of the fan-shaped area is gradually increased in a clockwise direction or a counterclockwise direction until the center angle reaches 1800 so that a size of the fan-shaped area is increased. The size of the activated screen which displays the image is reduced by as much as the increase in size of the fan-shaped area in which the black pattern NB is displayed.

When the flexible display panel 100 is being switched from the folded state to the unfolded state, the fan-shaped area decreases in the clockwise direction or the counterclockwise direction until the center angle of the fan-shaped area reaches from 1800 to 0°. The size of the activated screen which displays the image is gradually increased by as much as the reduction in size of the fan-shaped area which is the black pattern NB.

A line resistance value of the flexible display panel 100 may be varied according to the folding angle of the flexible display panel 100. The image processor may vary a resolution V of the activated screen according to a resistance value of the flexible display panel 100 as the following Equation 1.

$$V = \frac{T}{2} + \frac{(B-C)}{(B-A)} * \frac{T}{2} \qquad \text{[Equation 1]}$$

Here, V is a current resolution in a direction in which the image is shifted. The direction in which the image is shifted may be a Y-axis direction in FIG. 1. T is a total resolution of all the screens L, A, and R in the direction in which the image is shifted. T may be the total resolution of a Y-axis in FIG. 1. When the flexible display panel 100 is unfolded (180°), A is the line resistance value of the flexible display panel 100. When the flexible display panel 100 is folded (0°), B is the line resistance value of the flexible display panel 100. C is a current line resistance value of the flexible display panel 100.

For example, when T=2000, A=100Ω, B=200Ω, and C=150Ω, it is found that V=2000/2+(200−150)/(200−100) *2000/2=1500.

In the foldable display of the present disclosure, while the unfolded state is switched to the folded state, one or more pixel lines or pixel columns belonging to the activated screen may be switched to the non-activated screen at every n frame time (n is a natural number). The non-activated screen may display a gray scale value corresponding to the black color. In this case, the size of the non-activated screen may be increased by as much as one or more pixel lines or pixel columns at every n frame time.

In the foldable display of the present disclosure, while the folded state is switched to the unfolded state, one or more pixel lines or pixel columns belonging to the non-activated screen may be switched to the activated screen at every n frame time. In this case, the size of the activated screen may be increased by as much as one or more pixel lines or pixel columns at every n frame time.

According to the present disclosure, a resolution of the activated screen is varied according to the line resistance value of the flexible display panel 100 so that the size of the activated screen may be gradually varied according to the folding angle of the flexible display panel 100.

According to the present disclosure, a ratio of the black pattern NB displayed on the non-activated screen to all the screens L, A, and B is varied according to the line resistance value of the flexible display panel 100 so that the size of the activated screen may be gradually varied according to the folding angle of the flexible display panel 100.

FIG. 34 is a diagram illustrating a resolution converter.

Referring to FIG. 34, the resolution converter includes a measuring part 351 connected to the line of the flexible display panel 100, and an image processor 352 for varying a resolution of the input image in response to the output data of the measuring part 351.

The flexible display panel 100 may include one or more among data lines 102, gate lines 31, 32*a*, and 32*b*, and power lines 104 and 105, but the present disclosure is not limited thereto. The line of the flexible display panel 100 may be a separate line which is separated from the data lines 102, the gate lines 31, 32*a*, and 32*b*, and the power lines 104 and 105. For example, the separate line may be a line pattern of a strain gauge. The measuring part 351 measures a line resistance value of the flexible display panel 100 in real time and provides the measured result to the image processor 352.

The image processor 352 receives an output signal of the measuring part 351 and varies a resolution of the activated screen according to the line resistance value of the flexible display panel 100. A resolution variation method using Equation 1 or a method of varying a resolution by as much as a predetermined number of pixel lines or pixel columns in a unit of a predetermined frame time may be applied. The image processor 352 receives the output signal of the measuring part 351 and varies the size of the non-activated screen according to the line resistance value of the flexible display panel 100.

Pixel data of an image of which a resolution is varied due to the image processor 352 may be provided to the timing controller 303. The timing controller 303 may supply the pixel data, which is input from the image processor 352, to a data driver 306. The timing controller 303 may execute a predetermined image quality compensation algorithm to modulate the pixel data of the image received from the image processor 352 to an optical compensation value, thereby supplying the optical compensation value to the data driver 306.

The image processor 352 may vary a resolution using a scaler which varies the resolution of the image. The image processor 352 may be disposed in the host system 200 or the drive IC 300.

Figure 35:
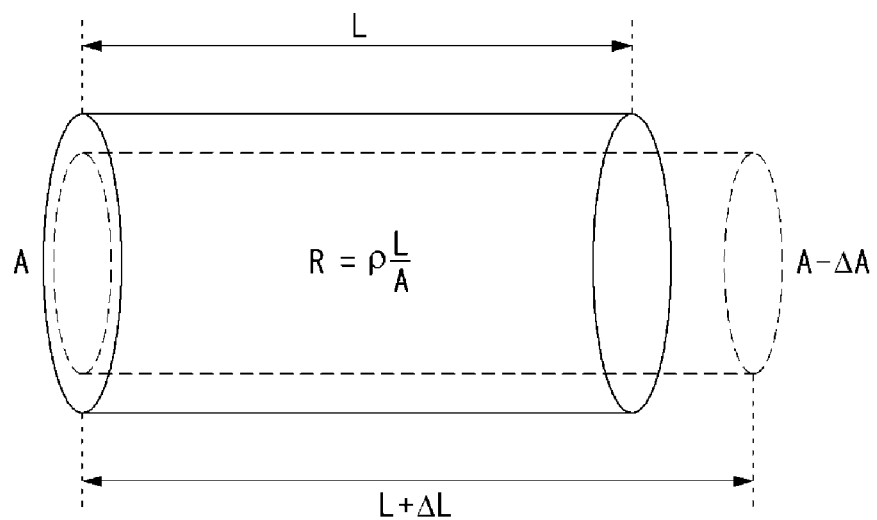
FIG. 35 is a diagram illustrating an example in which a line resistance value of the flexible display panel is varied.

FIG. 35 is a diagram illustrating an example in which a line resistance value of the flexible display panel 100 is varied.

Referring to FIG. 35, the line of the flexible display panel 100 is formed as a metal line.

A resistance R of the line is defined as Equation 2.

$$R = \rho \frac{L}{A} \qquad \text{[Equation 2]}$$

where ρ is resistivity, L is a length of the line and A is a cross-sectional area of the line.

When the flexible display panel 100 is deformed, the line formed on the flexible display panel 100 may be compressed and tensioned due to the deformation of the flexible display panel 100. As shown by a dotted line in FIG. 35, when the line is tensioned, the length L of the line is increased and the cross-sectional area A thereof is decreased. When the line is compressed, the length L of the line is decreased and the cross-sectional area A thereof is increased. Therefore, when the line is tensioned or compressed, line resistance may be varied. When ΔR is a variance of the line resistance, ΔR/R may be increased when the line is tensioned. Meanwhile, when the line is compressed, ΔR/R may be decreased.

Figure 36:
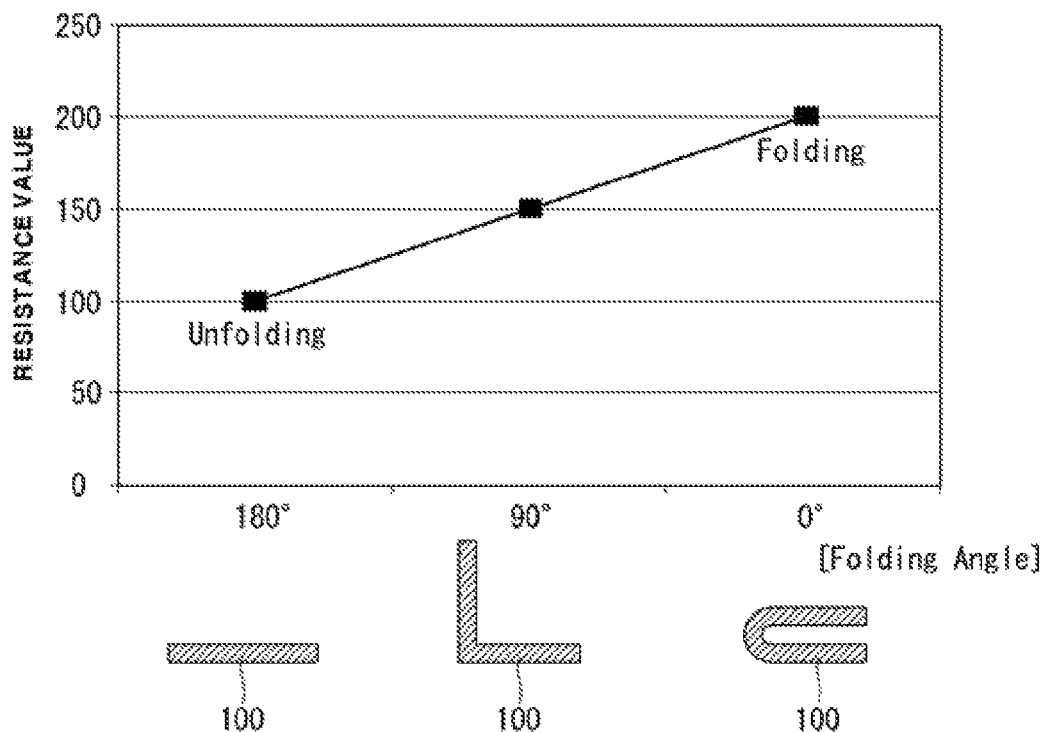
FIG. 36 is a test result diagram illustrating a variation in resistance value according to a folding angle of the flexible display panel.
Figure 38:
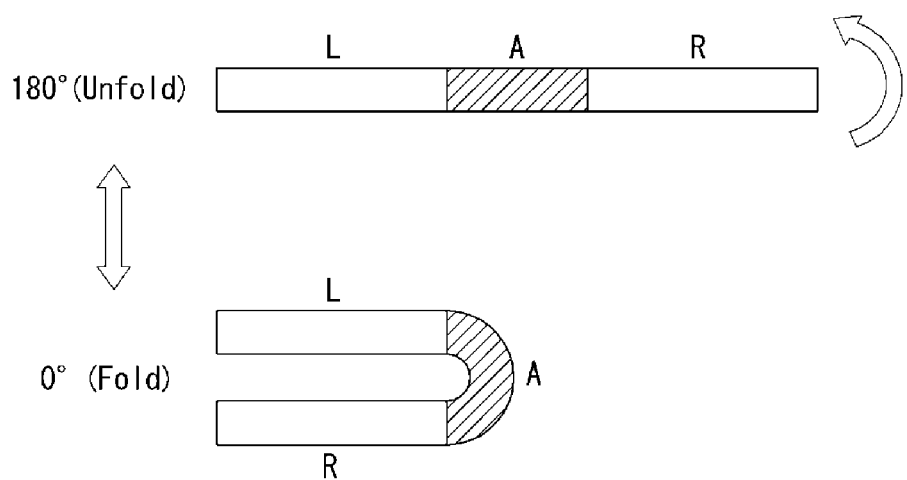
FIG. 38 is a diagram illustrating deformation of a folding boundary in the folded state and the unfolded state of the flexible display panel.

As shown in FIGS. 36 and 38, in a folding state in which the flexible display panel 100 is being folded, a tensile force acts on the line of the folding boundary A such that a resistance value of the line may be increased. Meanwhile, in a unfolding state in which the flexible display panel 100 is being unfolded, the resistance value of the line on the folding boundary A may be smaller than the resistance value in the folded state.

FIG. 37 is a diagram illustrating a resolution converter according to another aspect of the present disclosure.

Referring to FIG. 37, a resistance measuring device 360 of the present disclosure is connected to a line 130 of the flexible display panel 100.

The resistance measuring device 360 includes an amplifier 361, a sample & holder 362, an analog-to-digital converter (ADC) 363, and a comparator 364.

The amplifier 361 amplifies a voltage difference between both ends of the line using an operational amplifier (Op-amp) and provides the amplified voltage difference to the sample & holder 362. A resistance value of the line 130 is varied according to the folding angle of the flexible display panel 100. The voltage difference between the both ends of the amplifier 361 is varied according to the resistance value of the line 130. Thus, an output voltage of the amplifier 361 is varied according to the folding angle of the flexible display panel 100.

One end of the line 130 is connected to a non-inverted terminal of the amplifier 361, and a predetermined reference voltage Vref is applied to the one end of the line 130. The other end of the line 130 is connected to an inverted terminal of the amplifier 361. An output terminal of the amplifier 361 is connected to an input terminal of the sample & holder 362.

The sample & holder 362 samples an output voltage of the amplifier 361 and supplies the sampled output voltage to the ADC 363. The ADC 363 converts the voltage sampled by the sample & holder 362 into digital data and inputs the digital data to the comparator 364.

The comparator 364 compares output data of the ADC 363 with a predetermined reference value and outputs a difference value. A value of output data of the comparator 364 is determined according to the resistance value of the line 130. Thus, the resistance measuring device 360 may measure the folding angle of the flexible display panel 100.

The resistance value of line 130 measured by the resistance measuring device 360 in real time is provided to an image processor. The image processor may be embedded in the host system 200 or the drive IC 300.

The host system 200 receives the resistance value of the line 130 which is input from the resistance measuring device 360. The host system 200 varies the resolution V of the activated screen and the size of the black pattern NB of the non-activated screen according to the folding angle of the flexible display panel 100 using the image processor to transmit the varied resolution V and the varied size to the drive IC 300.

When the image processor is embedded in the drive IC 300, the drive IC 300 may vary a resolution V of an image input from the host system 200 and a resolution V and a size of a black pattern NB of the activated screen according to the folding angle of the flexible display panel 100.

FIG. 38 is a diagram illustrating deformation of a folding boundary in the folded state and the unfolded state of the flexible display panel.

Referring to FIG. 38, the resistance value of the line 130 on the folding boundary A may be varied according to the folding angle of flexible display panel 100. In the folded state of the flexible display panel 100, the tensile force acts so that the resistance value of the line 130 may be increased. Meanwhile, in the unfolded state in which the flexible display panel 100 is unfolded, the resistance value of the line on the folding boundary A may be smaller than the resistance value in the folded state.

Figure 39:
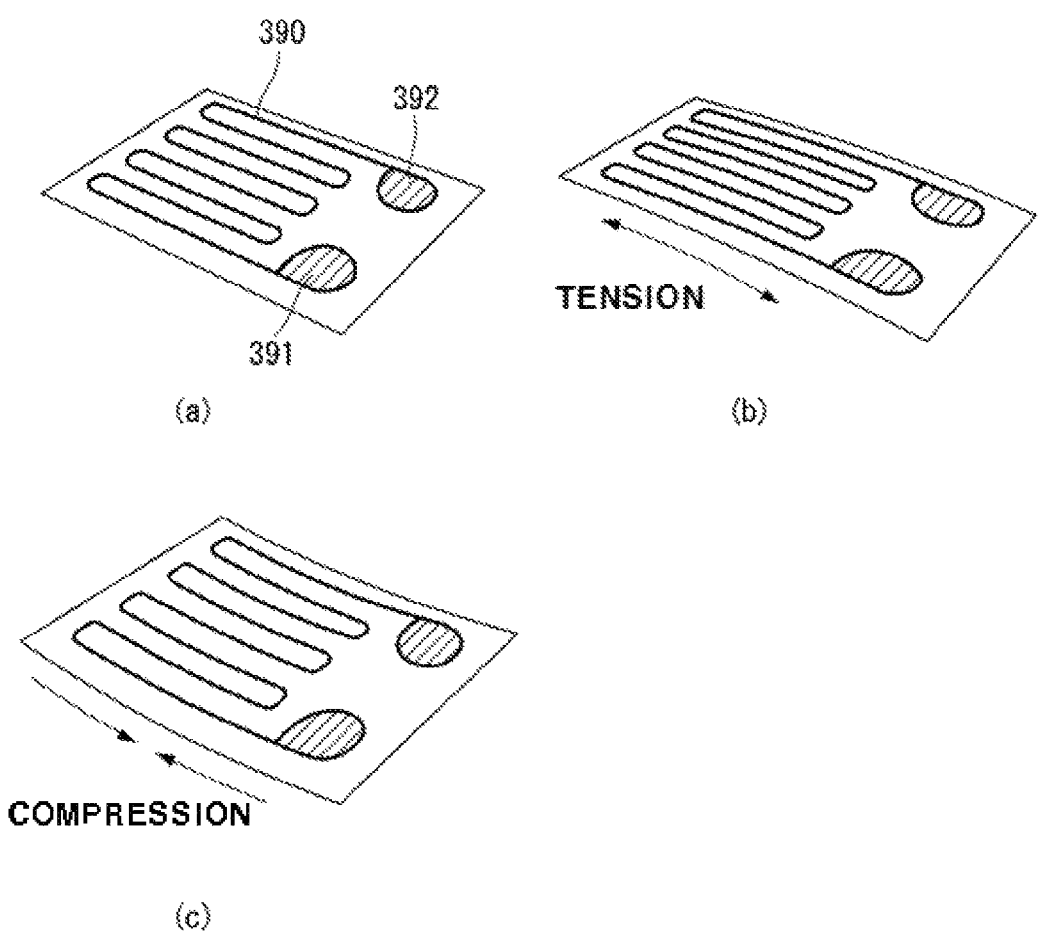
FIG. 39 is a diagram illustrating line deformation in the folded state and the unfolded state of the flexible display panel.

FIG. 39 is a diagram illustrating deformation of the line 130 in the folded state and the unfolded state of the flexible display panel.

Referring to FIG. 39A, the line 130 includes a line 390 bent in the form of a zigzag and pads 391 and 392 formed on both distal ends of the line 390. The pads 391 and 392 are connected to both input ends of the amplifier 361.

At least a portion of the line 390 is disposed on the folding boundary A. When the flexible display panel 100 is folded based on the folding boundary A, in order to increase the tensile force applied to the line 390 to allow a variation in resistance value to be increased, the line 390 may be formed on a substrate of the flexible display panel 100 to cross the folding boundary A. A length direction of the folding boundary A may be orthogonal to that of the line 390. For example, in FIG. 1, the length direction of the folding boundary A is an X-axis direction. In this case, the length direction of the line 390 is a Y-axis direction.

Since the line 390 is bent in the form of a zigzag, a resistance value of the line 390 is large, and, when the folding boundary A is deformed, a variation in resistance value may become larger.

As shown in FIG. 39B, in the folded state of the flexible display panel 100, the line 390 formed on the folding boundary A is tensioned to increase the resistance value of the line 130. On the other hand, as shown in FIG. 39C, when the flexible display panel 100 is unfolded, the line 390 is compressed to decrease the resistance value of the line 130.

Figure 41:
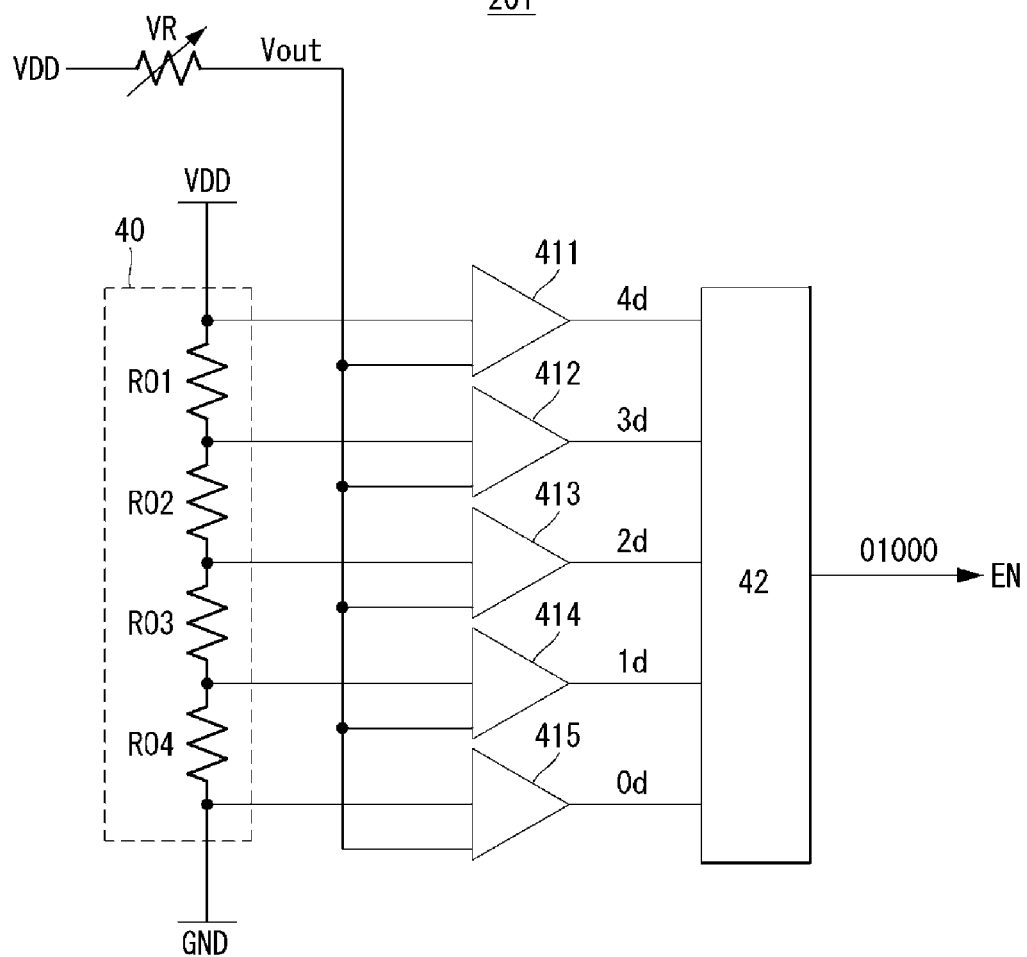
FIG. 41 is a diagram illustrating a resistance measuring device according to another aspect of the present disclosure.

FIGS. 40 and 41 are diagrams illustrating a resistance measuring device according to another aspect of the present disclosure. FIG. 40A illustrates an out-folding type foldable display. FIG. 40B illustrates an in-folding type foldable display.

Referring to FIGS. 40 and 41, a resistance measuring device 201 includes a variable resistor VR of which a resistance value is varied according to deformation of the flexible display panel 100, a reference voltage generator 40, a plurality of comparators 411 to 415, and an encoder 42.

The flexible display panel 100 may be adhered to a base plate 110. The base plate 110 includes a first support layer 111, a second support layer 112, and a hinge 113 for connecting the first support layer 111 to the second support layer 112.

The first screen L of the flexible display panel 100 is adhered onto the first support layer 111, and the second screen R thereof is adhered onto the second support layer 112. The folding boundary A is located at a portion of the hinge 113 of the base plate 110.

The user may fold the flexible display panel 100 together with the base plate 110. The variable resistor VR includes a plurality of resistors R1 to R5 connected through the hinge 113 according to a folding angle. At the folding angle shown in FIG. 40, the variable resistor VR is R2+R5. The variable resistor VR may be varied to R1+R5, R2+R5, R3+R5, or R4+R5 according to the folding angle of the flexible display panel 100. A folding voltage Vout, which is a voltage dropped by as much as a resistance value of the variable resistor VR, is applied to the comparators 411 to 415.

The reference voltage generator 40 divides a high potential reference voltage VDD and a ground voltage source GND and outputs a plurality of reference voltages having different voltage levels through voltage dividing nodes. Each of the comparators 411 to 415 compares a reference voltage from the reference voltage generator 40 with the folding voltage Vout, outputs a high voltage when the folding voltage Vout is higher than the reference voltage, and outputs a low voltage when the folding voltage Vout is lower than or equal to the reference voltage.

The first comparator 411 compares a highest level reference voltage with a folding voltage Vout and outputs a highest voltage when the folding voltage Vout is higher than the highest level reference voltage, otherwise, the first comparator 411 outputs a low voltage. The fifth comparator 415 compares a lowest level reference voltage with the folding voltage Vout and outputs the high voltage when the folding voltage Vout is higher than the lowest level reference voltage, otherwise, the fifth comparator 415 outputs the low voltage.

The encoder 42 may convert voltages output from the comparators 411 to 415 into digital codes to output enable signals EN. For example, when a first voltage 4d output from the first comparator 411 is a low voltage, the encoder 42 may output zero as a most significant bit, and, when a second voltage 3d output from the second comparator 412 is a low voltage, the encoder 42 may output one as a next most significant bit. When a fifth voltage 0d output from the fifth comparator 415 is a low voltage, the encoder 42 may output zero as a least significant bit.

The resistance measuring device 201 shown in FIGS. 40 and 41 measures a variation in resistance of a support for supporting the flexible display panel 100 to measure the folding angle of the flexible display panel 100 instead of directly measuring resistance of the line of the flexible display panel 100. A method of directly measuring the resistance of the line of the flexible display panel 100 is more effective in reducing a thickness and a cost of the foldable display.

The foldable display of the present disclosure and a driving method thereof may be described below.

A foldable display comprises: a flexible display panel including a screen which displays an image; a measuring part configured to measure a folding angle of the flexible display panel; and an image processor configured to vary a size of the image displayed on the screen and a size of a black pattern displayed on the screen of the flexible display panel while the folding angle of the flexible display panel is varied.

The measuring part measures the folding angle of the flexible display panel on the basis of a resistance value of a line formed on the flexible display panel.

The measuring part measures the folding angle of the flexible display panel on the basis of resistance of a support configured to support the flexible display panel.

The measuring part measures resistance of a folding boundary on the screen of which a curvature is varied according to the folding angle of the flexible display panel.

The foldable display further comprises a display panel driver configured to activate the entire screen of the flexible display panel to display the image on a maximum screen when the flexible display panel is unfolded in an unfolded state and activate a part of the screen when the flexible display panel is folded in a folded state to display the image on an activated screen that is smaller than the maximum screen and display the black pattern on an non-activated screen.

The image processor gradually varies a size and a resolution of the image during a state switching time between the unfolded state and the folded state of the flexible display panel.

The image processor gradually decreases the resolution of the image and gradually enlarges the size of the black pattern while the unfolded state of the flexible display panel is switched to the folded state of the flexible display panel.

The image processor gradually increases the resolution of the image and gradually reduces the size of the black pattern while the folded state of the flexible display panel is switched to the unfolded state of the flexible display panel.

The image processor shifts pixel data of the image in one direction and gradually varies the resolution of the image while the folding angle of the flexible display panel is varied.

The image processor gradually varies a size of a fan-shaped area in which the black pattern is displayed and gradually varies a size of an activated area in which the image is displayed while the folding angle of the flexible display panel is varied.

The screen of the flexible display panel includes data lines to which data voltages are applied, gate lines which cross the data lines and to which gate signals are applied, and a plurality of pixels disposed in a form of a matrix, Each of the pixels includes: a light emitting element; a drive element disposed between a pixel driving voltage and the light emitting element to supply a current to the light emitting element; and a capacitor connected between a first power line to which the pixel driving voltage is applied and a first node to which an initialization voltage is applied.

The gate signal includes: a scan signal synchronized with a data voltage of an input image in the activated screen and controlling a switching element connected to an anode of the light emitting element in the non-activated screen to supply an initialization signal, which suppresses light emission of the light emitting element, to the anode of the light emitting element; and a light emission control signal which switches a current path of the light emitting element.

The drive element includes a first electrode connected to the first node, a gate connected to a second node, and a second electrode connected to a third node.

Each of the pixels includes: a first switching element turned on in response to a gate-on voltage pulse of an $N^{th}$ scan signal (N is a natural number) to connect the second node to the third node; a second switching element turned on in response to the gate-on voltage pulse of the $N^{th}$ scan signal to connect the data line to the first node; a third switching element turned on in response to a gate-on voltage of the light emission control signal to connect the first power line to the first node; a fourth switching element turned on in response to the gate-on voltage of the light emission control signal to connect the drive element to the anode of the light emitting element; a fifth switch element turned on in response to a gate-on voltage of a $(N-1)^{th}$ scan signal to connect the second node to a second power line to which the initialization voltage is supplied; and a sixth switching element turned on in response to the gate-on voltage of the $(N-1)^{th}$ scan signal in the activated screen to connect the second power line to the anode of the light emitting element and turned on in response to the gate-on voltage of the $N^{th}$ scan signal in the non-activated screen to connect the second power line to the anode of the light emitting element.

The gate-on voltage pulse of the $N^{th}$ scan signal is generated subsequent to the gate-on voltage pulse of the $(N-1)^{th}$ scan signal. The $N^{th}$ scan signal is synchronized with the data voltage of the input image in the activated screen and turns the sixth switching element on in the non-activated screen to supply the initialization signal to the anode of the light emitting element.

The first to sixth switching elements are turned on in response to the gate-on voltage and turned off in response to a gate-off voltage.

A driving time of each of the pixels is divided into an initialization time, a sampling time, a data write time, and a light emission time.

The $(N-1)^{th}$ scan signal is generated as a pulse of the gate-on voltage during the initialization time. A voltage of each of the $N^{th}$ scan signal and the light emission control signal is generated as the gate-off voltage. The Nth scan signal is generated as the pulse of the gate-on voltage, and a voltage of each of the $(N-1)^{th}$ scan signal and the light emission control signal is generated as the gate-off voltage during the sampling time. A voltage of each of the $(N-1)^{th}$ scan signal, the $N^{th}$ scan signal, and the light emission control signal is generated as the gate-off voltage during the data write time. The light emission control signal is generated as the gate-off voltage, and the voltage of each of the $(N-1)^{th}$ scan signal and the $N^{th}$ scan signal is generated as the gate-off voltage during at least some time of the light emission time.

The initialization voltage is supplied to the anode of the light emitting element in the non-activated screen during the sampling time of the non-activated screen. The third and fourth switching elements are turned off according to the gate-off voltage of the light emission control signal during the sampling time of the non-activated screen.

A method of driving a foldable display, comprises: measuring a folding angle of a flexible display panel; and varying a size of an image and a size of a black pattern displayed on the screen of the flexible display panel while the folding angle of the flexible display panel is varied.

Varying the size of the image and the size of the black pattern displayed on the screen of the flexible display panel while the folding angle of the flexible display panel is varied includes gradually decreasing a resolution of the image and gradually enlarging a size of the black pattern while an unfolded state of the flexible display panel is switched to a folded state of the flexible display panel.

Varying the size of the image and the size of the black pattern displayed on the screen of the flexible display panel while the folding angle of the flexible display panel is varied further includes gradually increasing the resolution of the image and gradually reducing the size of the black pattern while the folded state of the flexible display panel is switched to the unfolded state of the flexible display panel.

Varying the size of the image and the size of the black pattern displayed on the screen of the flexible display panel while the folding angle of the flexible display panel is varied further includes, shifting pixel data of the image in one direction and gradually varying the resolution of the image while the folding angle of the flexible display panel is varied.

Varying the size of the image and the size of the black pattern displayed on the screen of the flexible display panel while the folding angle of the flexible display panel is varied further includes gradually varying a size of a fan-shaped area in which the black pattern is displayed and gradually varying the size of the image while the folding angle of the flexible display panel is varied.

In accordance with the present disclosure, a part of a screen not driven in a foldable display, for example, a screen at which a user does not look is non-activated in a folded state, and a voltage which suppresses light emission of a light emitting element in the non-activated screen is applied so that it is possible to reduce power consumption, increase a battery lifetime, and allow the non-activated screen to fully display black.

In accordance with the present disclosure, a gate driver is divided into two or more gate drivers to drive a screen without applying data voltages to pixels of the non-activated screen in the folded state of the foldable display so that it is possible to sufficiently secure a blank interval in which the pixels are not driven.

In accordance with the present disclosure, the activated screen at which a user looks can be driven on the foldable display at a high speed. In a VR mode, the screen is driven at a high speed so that it is possible to reduce motion sickness and fatigue of the user.

In accordance with the present disclosure, sizes of an activated screen and a non-activated screen can be varied on the basis of a variation in resistance value measured when a folding angle of a flexible display panel is varied. Resistance can be measured by directly measuring resistance of the flexible display panel or through resistance of a support for supporting the flexible display panel. A method of directly measuring line resistance can reduce a thickness and a cost of the foldable display.

In accordance with the present disclosure, when a state is being switched between a folded state and an unfolded state of the foldable display, the size of the non-activated screen displaying black can be gradually reduced or increased. Therefore, in accordance with the present disclosure, screen adaptability of a user can be improved through smooth screen switching without flickering when the state is being switched between the folded state and the unfolded state of the foldable display.

Since the content of the present disclosure described in the problems to be solved, the problem-solving means, and effects does not specify essential features of the claims, the scope of the claims is not limited to matters described in the content of the disclosure. It should be noted that effects of the present disclosure are not limited to the above-described effect, and other effects of the present disclosure will be apparent to those skilled in the art from the appended claims.

While the aspects of the present disclosure have been described in detail above with reference to the accompanying drawings, the present disclosure is not limited to the aspects, and various changes and modifications may be made without departing from the technical spirit of the present disclosure. Accordingly, the aspects disclosed herein are to be considered descriptive and not restrictive of the technical spirit of the present disclosure, and the scope of the technical spirit of the present disclosure is not limited by the aspects. Therefore, it should be understood that the above aspects are illustrative rather than restrictive in all respects. The scope of the disclosure should be construed by the appended claims, and all technical spirits within the scopes of their equivalents should be construed as being included in the scope of the disclosure.

What is claimed is:
1. A foldable display comprising:
a flexible display panel including a screen which displays an image;
a measuring part configured to measure a folding angle of the flexible display panel; and
an image processor configured to vary a size of the image displayed on the screen and a size of a black pattern displayed on the screen of the flexible display panel while the folding angle of the flexible display panel is varied,
a display panel driver configured to activate an entire screen of the flexible display panel to display the image on a maximum screen when the flexible display panel is in an unfolded state and activate a part of the screen when the flexible display panel is in a folded state to display the image on an activated screen and display the black pattern on a non-activated screen; and
a gate driver divided into two or more gate drivers and driving a screen without applying data voltages to pixels of the non-activated screen in the folded state of the foldable display,
while the flexible display panel is folding, the size of the black pattern on the screen gradually increases as the size of the image on the screen decreases, and
while the flexible display panel is unfolding, the size of the black pattern on the screen gradually decreases as the size of the image on the screen increases.

2. The foldable display of claim 1, wherein the image processor gradually varies a size and a resolution of the image during a switching time between the unfolded state and the folded state of the flexible display panel.

3. The foldable display of claim 2, wherein the image processor gradually decreases the resolution of the image and gradually enlarges the size of the black pattern while the unfolded state of the flexible display panel is switched to the folded state of the flexible display panel.

4. The foldable display of claim 2, wherein the image processor gradually increases the resolution of the image and gradually reduces the size of the black pattern while the folded state of the flexible display panel is switched to the unfolded state of the flexible display panel.

5. The foldable display of claim 2, wherein, the image processor shifts pixel data of the image in one direction and gradually varies the resolution of the image while the folding angle of the flexible display panel is varied.

6. The foldable display of claim 2, wherein the image processor gradually varies a size of a fan-shaped area in which the black pattern is displayed and gradually varies a size of an activated area in which the image is displayed while the folding angle of the flexible display panel is varied.

7. A foldable display comprising:
a flexible display panel including a screen which displays an image;
a measuring part configured to measure a folding angle of the flexible display panel; and
an image processor configured to vary a size of the image displayed on the screen and a size of a black pattern displayed on the screen of the flexible display panel while the folding angle of the flexible display panel is varied,
while the flexible display panel is folding, the size of the black pattern on the screen gradually increases as the size of the image on the screen decreases, and
while the flexible display panel is unfolding, the size of the black pattern on the screen gradually decreases as the size of the image on the screen increases.

8. The foldable display of claim 7, wherein the measuring part measures the folding angle of the flexible display panel based on a resistance value of a wiring line formed on the flexible display panel.

9. The foldable display of claim 7, wherein the measuring part measures the folding angle of the flexible display panel based on resistance of a support element that supports the flexible display panel.

10. The foldable display of claim 7, wherein the measuring part measures resistance of a folding boundary on the screen of which a curvature is varied according to the folding angle of the flexible display panel.

11. The foldable display of claim 7, further comprising a display panel driver configured to activate an entire screen of the flexible display panel to display the image on a maximum screen when the flexible display panel is in an unfolded state and activate a part of the screen when the flexible display panel is in a folded state to display the image on an activated screen that is smaller than the maximum screen and display the black pattern on a non-activated screen.

12. The foldable display of claim 11, wherein the image processor gradually varies a size and a resolution of the image during a switching time between the unfolded state and the folded state of the flexible display panel.

13. The foldable display of claim 12, wherein the image processor gradually decreases the resolution of the image and gradually enlarges the size of the black pattern while the unfolded state of the flexible display panel is switched to the folded state of the flexible display panel.

14. The foldable display of claim 12, wherein the image processor gradually increases the resolution of the image and gradually reduces the size of the black pattern while the folded state of the flexible display panel is switched to the unfolded state of the flexible display panel.

15. The foldable display of claim 12, wherein, the image processor shifts pixel data of the image in one direction and gradually varies the resolution of the image while the folding angle of the flexible display panel is varied.

16. The foldable display of claim 12, wherein the image processor gradually varies a size of a fan-shaped area in which the black pattern is displayed and gradually varies a size of an activated area in which the image is displayed while the folding angle of the flexible display panel is varied.

17. The foldable display of claim 11, wherein the screen of the flexible display panel includes data lines to which data voltages are applied, gate lines which cross the data lines and to which gate signals are applied, and a plurality of pixels disposed in a form of a matrix,
wherein each of the pixels includes:
a light emitting element;
a drive element disposed between a pixel driving voltage and the light emitting element to supply a current to the light emitting element; and
a capacitor connected between a first power line to which the pixel driving voltage is applied and a first node to which an initialization voltage is applied, and
wherein the gate signal includes:
a scan signal synchronized with a data voltage of an input image in the activated screen and controlling a switching element connected to an anode of the light emitting element in the non-activated screen to supply an initialization signal, which suppresses light emission of the light emitting element, to the anode of the light emitting element; and
a light emission control signal which switches a current path of the light emitting element.

18. The foldable display of claim 17, wherein the drive element includes a first electrode connected to the first node, a gate connected to a second node, and a second electrode connected to a third node,
wherein each of the pixels includes:
a first switching element turned on in response to a gate-on voltage pulse of an Nth scan signal (N being a natural number) to connect the second node to the third node;
a second switching element turned on in response to the gate-on voltage pulse of the Nth scan signal to connect the data line to the first node;
a third switching element turned on in response to a gate-on voltage of the light emission control signal to connect the first power line to the first node;
a fourth switching element turned on in response to the gate-on voltage of the light emission control signal to connect the drive element to the anode of the light emitting element;
a fifth switch element turned on in response to a gate-on voltage of a (N−1)th scan signal to connect the second node to a second power line to which the initialization voltage is supplied; and
a sixth switching element turned on in response to the gate-on voltage of the (N−1)th scan signal in the activated screen to connect the second power line to the anode of the light emitting element and turned on in response to the gate-on voltage of the Nth scan signal in the non-activated screen to connect the second power line to the anode of the light emitting element, wherein the gate-on voltage pulse of the Nth scan signal is generated subsequent to the gate-on voltage pulse of the (N−1)th scan signal, the Nth scan signal is synchronized with the data voltage of the input image in the activated screen and turns the sixth switching element on in the non-activated screen to supply the initialization signal to the anode of the light emitting element, and the first to sixth switching elements are turned on in response to the gate-on voltage and turned off in response to a gate-off voltage.

19. The foldable display of claim 18, wherein each of the pixels has a driving time divided into an initialization time, a sampling time, a data write time, and a light emission time;

wherein the (N−1)th scan signal is generated as a pulse of the gate-on voltage, and a voltage of each of the Nth scan signal and the light emission control signal is generated as the gate-off voltage during the initialization time;

wherein the Nth scan signal is generated as the pulse of the gate-on voltage, and a voltage of each of the (N−1)th scan signal and the light emission control signal is generated as the gate-off voltage during the sampling time;

wherein a voltage of each of the (N−1)th scan signal, the Nth scan signal, and the light emission control signal is generated as the gate-off voltage during the data write time; and wherein the light emission control signal is generated as the gate-off voltage, and the voltage of each of the (N−1)th scan signal and the Nth scan signal is generated as the gate-off voltage during at least some time of the light emission time.

20. The foldable display of claim 19, wherein the initialization voltage is supplied to the anode of the light emitting element in the non-activated screen during the sampling time of the non-activated screen; and wherein the third and fourth switching elements are turned off according to the gate-off voltage of the light emission control signal during the sampling time of the non-activated screen.

* * * * *